United States Patent [19]
Kagiwada et al.

[11] Patent Number: 5,197,283
[45] Date of Patent: Mar. 30, 1993

[54] HYDRAULIC-MOTOR DRIVE CIRCUIT SYSTEM WITH ANTI-CAVITATION CONTROL

[75] Inventors: Hitoshi Kagiwada, Ibaraki; Tomohiko Yasuoka, Toride, both of Japan

[73] Assignee: Hitachi Construction Machinery Co., Ltd., Tokyo, Japan

[21] Appl. No.: 667,403

[22] PCT Filed: Dec. 4, 1990

[86] PCT No.: PCT/JP90/01571

§ 371 Date: Apr. 1, 1991

§ 102(e) Date: Apr. 1, 1991

[87] PCT Pub. No.: WO91/08395

PCT Pub. Date: Jun. 13, 1991

[30] Foreign Application Priority Data

Dec. 4, 1989 [JP] Japan .................. 1-314699
Dec. 4, 1989 [JP] Japan .................. 1-314700
Aug. 30, 1990 [JP] Japan .................. 2-228835

[51] Int. Cl.⁵ .................. F16D 31/02; F16D 39/00
[52] U.S. Cl. .................. 60/464; 60/451; 60/488; 60/493
[58] Field of Search .................. 60/429, 459, 464, 475, 60/486, 488, 489, 493

[56] References Cited

U.S. PATENT DOCUMENTS

| | | | |
|---|---|---|---|
| 3,636,708 | 1/1972 | Karman | 60/475 X |
| 3,690,099 | 9/1972 | Sarnik et al. | 60/489 |
| 3,750,406 | 8/1973 | Verlinde et al. | 60/488 X |
| 3,811,525 | 5/1974 | Stuart | 60/464 X |
| 3,898,807 | 8/1975 | Habiger | 60/488 X |
| 4,354,351 | 10/1982 | Dezelan | 60/464 X |
| 4,395,878 | 8/1983 | Morita et al. | 60/488 X |
| 4,481,770 | 11/1984 | Lohbauer et al. | 60/489 X |
| 4,694,647 | 9/1987 | Yoshida | 60/493 X |
| 4,712,377 | 12/1987 | Yoshida et al. | 60/488 X |
| 4,779,417 | 10/1988 | Kita | 60/488 X |
| 5,062,266 | 11/1991 | Yoshimatsu | 60/493 X |

FOREIGN PATENT DOCUMENTS 62-19475 5/1987 Japan .
477239 10/1975 U.S.S.R. .................. 60/488

Primary Examiner—Edward K. Look
Assistant Examiner—John Ryznic
Attorney, Agent, or Firm—Fay, Sharpe, Beall, Fagan, Minnich & McKee

[57] ABSTRACT

A hydraulic-motor drive circuit system includes an auxiliary hydraulic source connected to one end of an auxiliary line, a low-pressure selector connected to the other end of the auxiliary line and a pair of main lines for causing the other end of the auxiliary line to communicate with one of the main lines on the low pressure side during rotation of a hydraulic motor for driving an inertia load, and a switching control arranged in the auxiliary line for supplying the hydraulic fluid from the auxiliary hydraulic source to the other end of the auxiliary line when the directional control valve is in a neutral position, cutting off the hydraulic fluid from the auxiliary hydraulic source to the other end of the auxiliary line when the directional control valve is in an operative position. When the directional control valve is returned to the neutral position to halt the hydraulic motor, if brake pressure is generated in the main line on the return side by inertial rotation of the hydraulic motor, the low-pressure selector causes the main line on the supply side to communicate with the auxiliary line, and the switching control enables the hydraulic fluid from the auxiliary hydraulic source to be supplied to the other end of the auxiliary line. Thus, the auxiliary hydraulic source replenishes hydraulic fluid into the main line on the supply side through the auxiliary line and the low-pressure selector, preventing cavitation in the main line on the low pressure side.

16 Claims, 21 Drawing Sheets

HYDRAULIC-MOTOR DRIVE CIRCUIT SYSTEM WITH ANTI-CAVITATION CONTROL

TECHNICAL FIELD

The present invention relates to hydraulic-motor drive circuit systems and, more particularly, to a hydraulic-motor drive circuit system which is provided in a construction machine such as, for example, a hydraulic excavator or the like and which is suitable for drivingly controlling a traveling hydraulic motor.

BACKGROUND ART

As disclosed, for example, in JP, U, 62-19475, a conventional traveling hydraulic-motor drive circuit system, which is used in a construction machine such as a hydraulic excavator or the like, comprises a hydraulic motor whose output shaft is connected to a traveler such as, for example, a crawler or the like, for rotatively driving a vehicle body which is an inertia load, a hydraulic pump serving as a main hydraulic source, a reservoir, a pair of main lines through which the hydraulic motor is connected to the hydraulic pump and the reservoir, and a directional control valve of normal open type arranged in the pair of main lines for switching a direction of hydraulic fluid supplied to the hydraulic motor from the hydraulic pump. further, a counter balance valve is arranged in the pair of main lines between the directional control valve and the hydraulic motor.

The counter balance valve comprises a pair of check valves, a pressure control valve arranged in parallel to the check valves and normally biased to a neutral position under biasing forces of springs, the pressure control valve being switched from the neutral position to left- and right-hand operative positions against the biasing forces of the springs when the hydraulic fluid from the hydraulic pump acts as pilot pressure, and a pair of restrictors for regulating or adjusting the switching speed of the pressure control valve. The pressure control valve is provided with intermediate restriction regions at respective locations between the neutral position and the operative positions, whereby when the pressure control valve is returned to the neutral position from the operative positions, a restriction action is given to return fluid from the hydraulic motor to generate brake pressure in the main line on the return side.

In the hydraulic-motor drive circuit system constructed as described above, when the directional control valve is switched to the operative positions from the neutral position, the hydraulic fluid from the hydraulic pump is supplied to the hydraulic motor through the directional control valve, one of the main lines and the corresponding check valve to rotate the hydraulic motor together with the inertial load. At this time, pressure within the main line (drive pressure of the hydraulic motor) on the outlet side of the directional control valve acts as pilot pressure on the pressure control valve of the counter balance valve through one of the restrictors. The pressure control valve is switched from the neutral position to the operative positions by the pilot pressure. Thus, the return fluid from the hydraulic motor is discharged to the reservoir through the other main line.

On the other hand, when the vehicle reaches a downward path or the like under the condition that the hydraulic motor is rotated together with the inertia load and then the hydraulic motor is caused to rotate by the inertia load, pressure within the main line on the supply side is reduced by a pump action of the hydraulic motor so that the pressure control valve of the counter balance valve tends to be returned to the neutral position from the operative positions through one of the restriction regions. Accordingly, the return fluid from the hydraulic motor is confined within the main line on the return side at a location between the hydraulic motor and the counter balance valve. Thus, the pressure in the main line on the return side is raised to a setting pressure of an overload relief valve which is provided in the pair of main lines, and brake pressure is generated in the main line on the return side, thereby preventing the vehicle from scampering at the downward path or the like.

Further, when the directional control valve is returned to the neutral position in order to halt or stop the vehicle under the condition that the hydraulic motor is rotated together with the inertia load, the hydraulic motor tends to continue to be rotated by the inertia load. Also in this case, since the pressure control valve of the counter balance valve tends to be returned to the neutral position from the operative positions through the restriction region, the brake pressure is generated within the main line on the return side similarly to the above, to halt the vehicle.

In the prior art, the pair of restrictors are provided in the counter balance valve as described above, and the return speed of the pressure control valve to the neutral position is regulated by the setting of the restrictors. In the case, however, where the restrictors are so set as to expedite the return speed of the pressure control valve, the main line on the return side is abruptly cut off or isolated by the pressure control valve so that shock or impact increases. Thus, it is usual to set the return speed of the pressure control valve to one which is more or less slow, in order to relieve the shock. Accordingly, in setting the counter balance valve described above, when the directional control valve is returned to the neutral position in order to halt the vehicle under the condition that the hydraulic motor is rotated together with the inertia load, the pressure control valve of the counter balance valve is not immediately returned to the neutral position.

During a period within which the pressure control valve is returned to the neutral position, the hydraulic motor continues to be inertially rotated so that a part of the hydraulic fluid (return fluid) discharged to the main line on the return side passes through the pressure control valve which is located in the restriction region. A part of the hydraulic fluid passes through the directional control valve of center open type located at the neutral position, and is discharged to the reservoir.

On the other hand, at this time, supply of the hydraulic fluid from the hydraulic pump is cut off completely by the directional control valve. Accordingly, although the hydraulic fluid within the main line on the return side is partially returned to the main line on the supply side through the overload relief valve, the operational hydraulic fluid within the main line on the supply side is insufficient, at least by the amount of the return fluid which has been discharged through the pressure control valve and the directional control valve, so that negative pressure is liable to be generated in the main line on the supply side. Thus, there is a fear that cavitation will occur.

Furthermore, in the above-described operation, after the pressure control valve of the counter balance valve has been returned to the neutral position, all the hydraulic fluid, which has been discharged into the main line on the return side under the pump action of the hydraulic motor, is returned to the main line on the supply side through the overload relief valve. Thus, discharge of the hydraulic fluid to the reservoir through the pressure control valve cease. However, leakage of the hydraulic fluid inevitably occurs from movable parts of hydraulic instruments such as the hydraulic motor and the like, and also, during a period within which the vehicle is halted after the directional control valve has been returned to the neutral position, brake pressure occurs due to the overload relief valve at a location within the main line on the return side, so that an amount of leakage will particularly become noticeable or remarkable. Thus, there is a fear that the operational hydraulic fluid within the main line on the supply side will likewise be insufficient due to the internal leakage, so that the negative pressure is liable to be generated and cavitation occurs.

Occurrence of the above-described cavitation will generate relatively large noises. Not only does this give an unpleasant feeling to an operator, but it also damages the hydraulic instruments such as the hydraulic motor and the like, to lower the service life thereof. Thus, occurrence of the cavitation becomes an issue which cannot be ignored in view of the operation and an increase in durability.

Moreover, a traveling hydraulic-motor drive circuit system is known which is utilized in a small hydraulic excavator or the like, in which the counter balance valve is omitted, and a directional control valve of the closed center type is used in substitution for the directional control valve of the normally open type. In the drive circuit system, the directional control valve has intermediate restriction regions between the neutral position and the left- and right-hand operative positions. Accordingly, it is possible to use the restriction regions to limit the return fluid, and to relieve shock at stoppage of the hydraulic motor.

However, the circuit system has also the following problem. That is, a meter-in restrictor and a meter-out restrictor of the directional control valve are set such that the opening of the meter-out restrictor is larger than that of the meter-in restrictor, in order to enable speed control of the hydraulic motor by meter-in control. Thus, during a period within which the directional control valve is in the restriction regions, the hydraulic fluid discharged to the reservoir from the main line on the return side increases more than that supplied to the main line on the supply side, so that operational hydraulic fluid within the main line on the supply side will likewise be insufficient, which generates cavitation.

Particularly, after the directional control valve has been returned to the neutral position, the operational hydraulic fluid within the main line on the supply side will be sufficient due to internal leakage within the hydraulic instruments such as the hydraulic motor and the like, similarly to the above-described case provided with the counter balance valve. Thus, cavitation will occur.

The invention has been constructed in view of the above problems of the prior art, and an object of the invention is to provide a hydraulic-motor drive circuit system capable of effectively preventing cavitation from occurring during inertia rotation of the hydraulic motor, capable of enhancing service life of hydraulic instruments such as the hydraulic motor and the like, capable of reducing shock at stoppage of the hydraulic motor or the like, and capable of enhancing reliability.

DISCLOSURE OF THE INVENTION

For the above purposes, according to the invention, there is provided a hydraulic-motor drive circuit system comprising a hydraulic motor for rotatively driving an inertia load, a hydraulic pump serving as a main hydraulic source, a reservoir, a pair of main lines through which the hydraulic motor is connected to the hydraulic pump and the reservoir, and a directional control valve arranged in the pair of main lines for switching a direction of hydraulic fluid supplied to the hydraulic motor from the hydraulic pump, wherein the system comprises an auxiliary hydraulic source; an auxiliary line having one end thereof connected to the auxiliary hydraulic source; low-pressure selecting means connected to the other end of the auxiliary line and the pair of main lines for causing the other end of the auxiliary line to communicate with one of the pair of main lines on the low pressure side during rotation of the hydraulic motor; and switching control means arranged in the auxiliary line for supplying the hydraulic fluid from the auxiliary hydraulic source to the other end of the auxiliary line when the directional control valve is at least in a neutral position, and for cutting off the supply of the hydraulic fluid from the auxiliary hydraulic source to the other end of the auxiliary line when the directional control valve is in an operative position.

With the above arrangement, when the brake pressure occurs in the main line on the return side due to inertial rotation of the hydraulic motor at the time the directional control valve is returned to the neutral position to halt the hydraulic motor, the low-pressure selecting means causes the main line on the supply side (that is, the main line on the low-pressure side), to communicate with the auxiliary line, and the switching control means enables the hydraulic fluid from the auxiliary hydraulic source to be supplied to the other end of the auxiliary line. Accordingly, the hydraulic fluid from the auxiliary hydraulic source is replenished to the main line on the supply side through the auxiliary line and the low-pressure selecting means, and thus when the hydraulic motor continues to be inertially rotated, the main line on the low pressure side will not be insufficiently supplied with operational hydraulic fluid. Thus, it is possible to prevent cavitation from occurring.

In a hydraulic-motor drive circuit system further comprising a counter balance valve arranged in the pair of main lines at a location between the directional control valve and the hydraulic motor, the low-pressure selecting means is connected to the pair of main lines at a location between the counter balance valve and the hydraulic motor. In this case, the switching control means includes valve means responsive to operation of the counter balance valve.

Here, preferably, the valve means includes an auxiliary control valve integrated with the counter balance valve. The auxiliary control valve may be incorporated in the counter balance valve.

Further, preferably, the low-pressure selecting means includes valve means incorporated in the counter balance valve.

Furthermore, in the hydraulic-motor drive circuit system, the switching control means may include valve means responsive to operation of the directional control valve. In this case, preferably, the valve means includes an auxiliary control valve integrated with the directional control valve.

Moreover, preferably, the switching control means further includes means for detecting whether or not the directional control valve is in the neutral position, and the valve means may include a solenoid proportional pressure-reducing valve arranged in the auxiliary line, and operative on the basis of a signal from the detecting means.

Further, preferably, the hydraulic-motor drive circuit system according to the invention further comprises a control line through which the auxiliary line is connected to another hydraulic actuator different from the hydraulic motor, and pressure control means for enabling hydraulic fluid of at least two different pressure levels to be supplied to the control line on the basis of the hydraulic fluid from the auxiliary hydraulic source. In this case, preferably, the hydraulic motor comprises a hydraulic motor of variable displacement type having a variable displacement element, and wherein the hydraulic actuator comprises an actuator which drives the variable displacement element to vary the displacement of the hydraulic motor. Furthermore, the other hydraulic actuator may comprise a brake device for braking the hydraulic motor.

Moreover, in the case where the hydraulic-motor drive circuit system comprises a counter balance valve as described above, the switching control means may include an auxiliary control valve responsive to operation of the counter balance valve, the control line may branch off from the auxiliary line at a location between the auxiliary hydraulic source and the auxiliary control valve, and the pressure control means may include a solenoid proportional pressure-reducing valve arranged in the auxiliary line at a location between the auxiliary hydraulic source and the branching point of the control line.

In this case, preferably, the pressure control means, further includes means manually operated by an operator, for outputting a signal to drive the solenoid proportional pressure-reducing valve.

The pressure control means may be so arranged as to further comprise means for detecting a drive force of the hydraulic motor, means for detecting whether or not the directional control valve is in the neutral position, and computation means for deciding a pressure of the hydraulic fluid to be supplied to the control line, on the basis of signals from both of the detecting means, to output a corresponding signal to the solenoid proportional pressure-reducing valve.

Furthermore, the pressure control means may be so arranged as to further include means for detecting pressure in one of the pair of main lines on the high pressure side at a location between the directional control valve and the counter balance valve, and computation means for deciding a pressure of the hydraulic fluid to be supplied to the control line, on the basis of a signal from the detecting means, to output a corresponding signal to the solenoid proportional pressure-reducing valve.

Moreover, the switching control means may include an auxiliary control valve responsive to operation of the directional control valve, and the pressure control means may include pressure setting means arranged in the auxiliary line at a location between the auxiliary hydraulic source and the auxiliary control valve for setting pressures of a plurality of levels including the two different levels, and valve means connected to the auxiliary line and the control line at a location between the auxiliary control valve and the low-pressure selecting means, the valve means being responsive to the pressures of the plurality of levels set by the pressure setting means for causing the auxiliary line to selectively communicate with the control line.

Further, the switching control means may include means for detecting whether or not the directional control valve is in the neutral position, and a solenoid proportional pressure-reducing valve arranged in the auxiliary line and operative at least on the basis of a signal from the detecting means for setting pressures of a plurality of levels including the two different levels, and the pressure control means may include valve means (159) connected to the auxiliary line and the control line at a location between the solenoid proportional pressure-reducing valve and the low-pressure selecting means, and responsive to the pressures of the plurality of levels set by the solenoid proportional pressure-reducing valve for causing the auxiliary line to selectively communicate with the control line.

Furthermore, the low-pressure selecting means may be a low-pressure selecting valve operative on the basis of a differential pressure between the pair of main lines, or may be a backflow preventing valve having a pair of check valves permitting only flows of the hydraulic fluid toward the pair of main lines, respectively.

BEST MODE FOR CARRYING OUT THE INVENTION

Various embodiments of the invention will be described below with reference to the drawings.

First Embodiment

A first embodiment of the invention will first be described with reference to FIGS. 1 through 3, giving an example of a traveling hydraulic motor of a hydraulic excavator.

Figure 1:
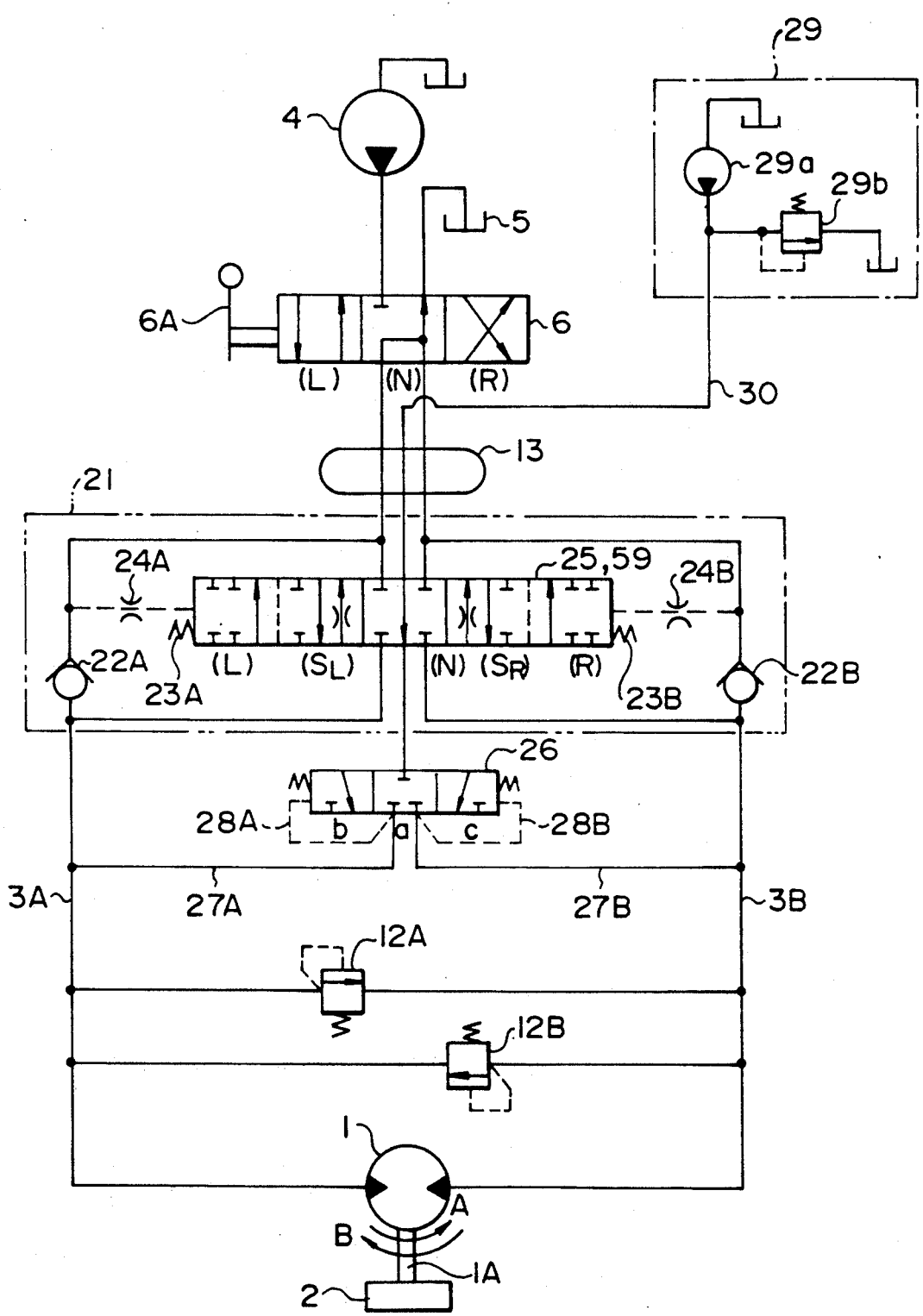
FIG. 1 is a schematic view of a hydraulic-motor drive circuit system according to a first embodiment of the invention, showing a condition in which the hydraulic motor is halted.

In FIG. 1, the reference numeral 1 denotes a traveling hydraulic motor fc: a hydraulic excavator. The hydraulic motor 1 is mounted to one of a pair of left- and right-hand lower travelers of the hydraulic excavator. The hydraulic motor 1 has its output shaft 1A which is connected to a crawler (not shown), to rotatively drive an inertia load such as a vehicle body or the like represented by the reference numeral 2. The hydraulic motor 1 is connected to a hydraulic pump 4 serving as a main hydraulic source and to a reservoir 5 through a pair of main lines 3A and 3B.

A directional control valve 6 is arranged on the way of the main lines 3A and 3B. The directional control valve 6 is switched from a neutral position N to left-and right-hand operative positions L and R by a control lever 6A, to control flow rate and the direction of hydraulic fluid which is supplied to the hydraulic motor 1 from the hydraulic pump 4. Further, the directional control valve 6 is of the normally open type, and can replenish operational hydraulic fluid within the reservoir 5 into the main lines 3A and 3B when the main lines 3A and 3B are brought to negative pressure at the neutral position N.

A counter balance valve 21 is disposed between the hydraulic motor 1 and the directional control valve 6 in the main lines 3A and 3B. The counter balance valve 21 comprises a pair of check valves 22A and 22B, a pressure control valve 25 arranged in parallel with the check valves 22A and 22B, and a pair of restrictors 24A and 24B for regulating the switching speed of the pressure control valve 25. The pressure control valve 25 is normally biased to the neutral position N under biasing forces of a pair of springs 23A and 23B. When the hydraulic fluid from the hydraulic pump 4 acts as pilot pressure, the pressure control valve 25 is switched from the neutral position N to the left- and right-hand operative positions L and R against the biasing forces of the springs 23A and 23B.

The pressure control valve 25 of the counter balance valve 21 is provided with a pair of intermediate restriction regions $S_L$ and $S_R$ at respective locations between the neutral position N and the operative positions L and R. When the pressure control valve 25 is returned to the neutral position N from the operative positions L and R, a restricting action is given to the return fluid from the hydraulic motor 1 by the restriction regions $S_L$ and $S_R$ to generate brake pressure in the main line 3A or 3B on the return side. Further, an auxiliary control valve 59, which opens and closes an auxiliary line 30 subsequently to be described, is integrally incorporated in the pressure control valve 25 of the counter balance valve 21. Thus, the pressure control valve 25 is composed of a directional control valve of hydraulic-pressure pilot type having six (6) ports and three (3) positions, for example.

A pair of overload relief valves 12A and 12B are disposed between the hydraulic motor 1 and the counter balance valve 21 in the main lines 3A and 3B. The relief valves 12A and 12B are provided for limiting an excessive pressure increase in the main line 3A or 3B on the return side at the time the hydraulic motor is rotated inertially. The excessive pressure occurring in the main line 3A or 3B on the return side is relieved to the main line 3B or 3A on the supply side through the relief valves 12A and 12B. A center joint 13, which serves as a swivel joint, is arranged at a location of the main lines 3A and 3B between the directional control valve 6 and the counter balance valve 21. The center joint 13 is arranged between a lower traveler and an upper swing of the hydraulic excavator, for example.

The reference numeral 29 denotes an auxiliary hydraulic source which is composed of an auxiliary pump 29a and a relief valve 29b for rendering constant delivery pressure from the auxiliary pump 29a. The auxiliary line 30 has one end thereof which is connected to the auxiliary pump 29a. The other end of the auxiliary line 30 is connected to a low-pressure selecting valve 26 through the center joint 13 and the auxiliary control valve 59 which is incorporated in the pressure control valve 25.

The low-pressure selecting valve 26 is constructed as a control valve of hydraulic pilot type having three (3) ports and three (3) positions, which is connected to the main lines 3A and 3B at a location between the hydraulic motor 1 and the counter balance valve 21. The low-pressure selecting valve 26 is switched from a neutral position a to left- and right-hand operative positions b and c by pilot pressures from a pair of pilot lines 28A and 28B, which communicate respectively with the main lines 3A and 3B. Switching the low-pressure selecting valve 26 causes the auxiliary line 30 to communicate with one of the main lines 3A and 3B on the low pressure side (refer to FIGS. 2 and 3).

The pressure control valve 25 of the counter balance valve 21 is integrated with the auxiliary control valve 59. The auxiliary control valve 59 is disposed in the auxiliary line 30, and functions to cause a portion of the auxiliary line 30 adjacent to the auxiliary pump 29a to communicate with the low-pressure selecting valve 26 at the restriction regions $S_L$ and $S_R$, and the neutral position N of the pressure control valve 25, and to cut off the auxiliary line 30 at the operative positions L and R. Accordingly, when the pressure control valve 25 is in the restriction regions $S_L$ and $S_R$ and the neutral position N, the hydraulic fluid from the auxiliary pump 29a is capable of being replenished into the main line 3A or 3B on the low pressure side through the low-pressure selecting valve 26 (refer to FIG. 3). When the pressure control valve 25 is switched to the operative position L or R, replenishing of the hydraulic fluid from the auxiliary pump 29a is halted.

The hydraulic-motor drive circuit system according to the embodiment is arranged as described above, and the basic operation relating to occurrence of the brake pressure of the counter balance valve 21 is not remarkably different from that according to the prior art.

In this embodiment, however, the arrangement is such that the pressure control valve 25 of the counter balance valve 21 is integrated with the auxiliary control valve 59 which opens and closes the auxiliary line 30, the low-pressure selecting valve 26 is provided at the location between the hydraulic motor 1 and the counter balance valve 21 in the main lines 3A and 3B through a pair of lines 27A and 27B, and the auxiliary pump 29a is connected to the low-pressure selecting valve 26 through the auxiliary line 30. With this arrangement, the following advantages can be produced.

Figure 2:
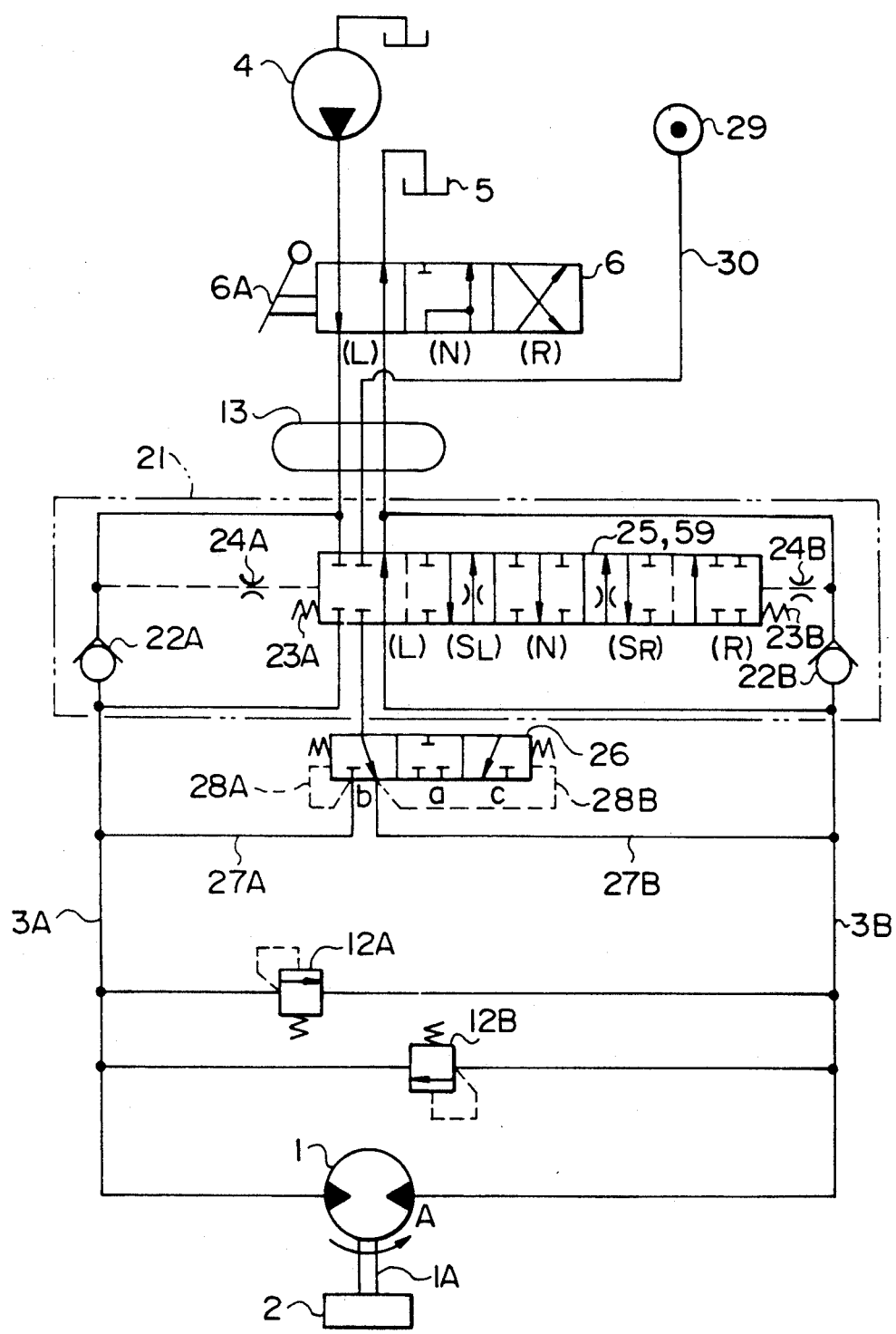
FIGS. 2 and 3 are views showing the hydraulic-motor drive circuit system shown in FIG. 1, respectively showing the time the hydraulic motor is rotated steadily and the time the hydraulic motor is rotated inertially.

First, when the directional control valve 6 is switched to the operative position L from the neutral position N as shown in FIG. 2 so that the pressure control valve 25 is switched to the operative position L from the neutral position N, and the hydraulic motor 1 is rotatively driven in the direction indicated by the arrow A, pressure increases on the side of the main line 3A, while pressure decreases on the side of the main line 3B, so that the low-pressure selecting valve 26 takes the operative position b to cause the auxiliary line 30 to communicate with the main line 3B on the low pressure side through the line 27B. At this time, since the pressure control valve 25 cuts off the auxiliary line 30 relative to the low-pressure selecting valve 25 at the operative position L, the hydraulic fluid from the auxiliary pump 29a is prevented from flowing into the main line 3B. Accordingly, it is possible to effectively prevent the hydraulic fluid from being consumed wastefully at the steady rotation of the hydraulic motor 1. This is similar also to the case where the directional control valve 6 is switched to the operative position R.

Figure 3:
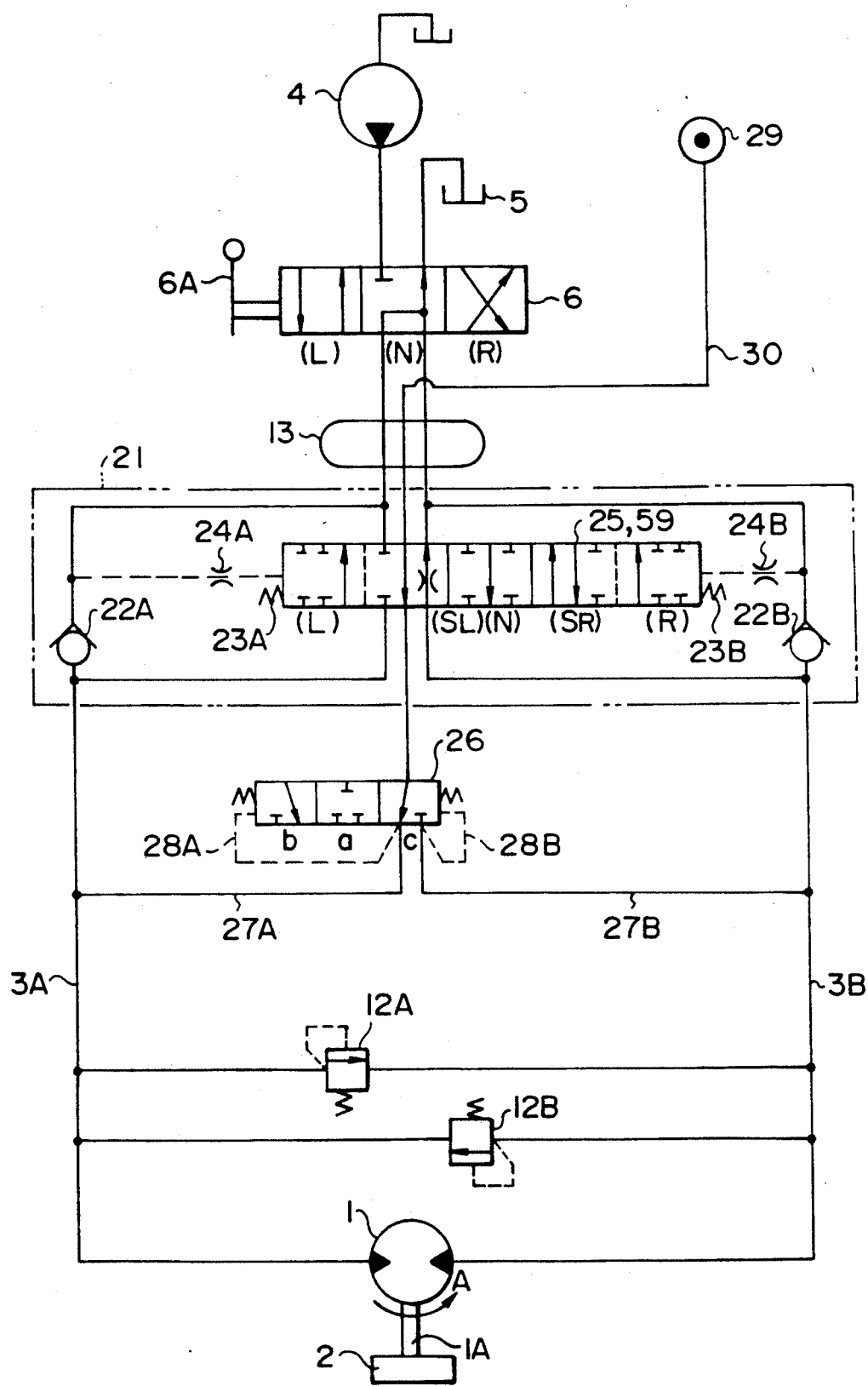

Moreover, when the directional control valve 6 is returned to the neutral position N as shown in FIG. 3 so that the pressure control valve 25 reaches the restriction region $S_L$ as the pressure control valve 25 is returned to the neutral position N from the operative position L, and the hydraulic motor 1 continues to be inertially rotated in the direction indicated by the arrow A, the hydraulic motor 1 performs a pump action to bring the interior of the main line 3A to low pressure, so that the low-pressure selecting valve 26 is switched to the operative position c. Thus, the hydraulic fluid from the auxiliary pump 29a is replenished into the main line 3A through the auxiliary line 30 and the line 27A, so that the interior of the main line 3A is not brought to negative pressure, thus preventing cavitation from occurring. Furthermore, after the pressure control valve 25 has been returned to the neutral position N, the low-pressure selecting valve 26 continues to be connected to the main line 3A on the low pressure side at the operative position c, for as long as the hydraulic motor 1 continues to be inertially rotated. Accordingly, the hydraulic fluid from the auxiliary pump 29a can be replenished into the main line 3A, making it possible to secure that the cavitation is prevented from occurring.

Thus, according to the embodiment, since the cavitation that is liable to occur at stoppage of the hydraulic motor can be prevented from occurring, it is possible to effectively prevent the hydraulic instruments, such as the hydraulic motor and the like, from being damaged due to the cavitation, which can reduce the service life thereof. Further, since the cavitation does not occur even if the restriction valves 24A and 24B are so set that the switching speed of the pressure control valve 25 is made slow, the degree of freedom of design of the entire counter balance valve 21 can be enhanced, making it possible to minimize shock at stoppage. Furthermore, since it is possible to prevent the hydraulic fluid from the auxiliary pump 29a from being consumed wastefully at the steady rotation of the hydraulic motor 1, an attempt can be made to raise efficiency.

Second Embodiment

A second embodiment of the invention will be described with reference to FIG. 4. The present embodiment is arranged such that, in order to integrate the auxiliary valve with the pressure control valve of the counter balance valve, a spool of the pressure control valve and a spool of the auxiliary valve are formed by a single spool, while the low-pressure selecting valve is provided in the spool so that the low-pressure selecting valve is also integrated with the pressure control valve. In the figure, constitutional elements identical with those of the first embodiment are designated by the same reference numerals, and the description of the identical constitutional elements will be omitted.

Figure 4:
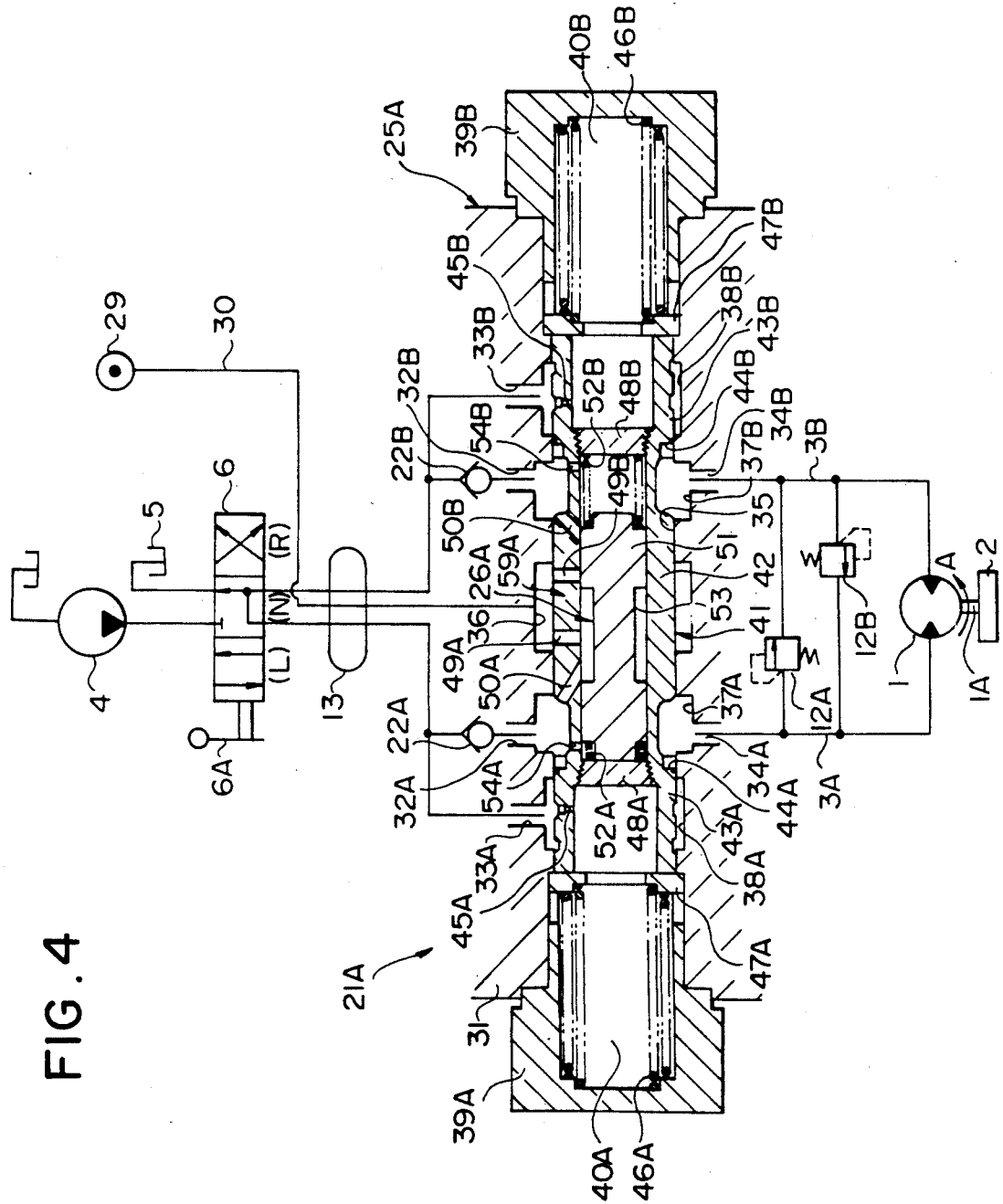
FIG. 4 is a view of a hydraulic-motor drive circuit system according to a second embodiment of the invention together with a valve structure.

In FIG. 4, the reference numeral 31 denotes a housing for a counter balance valve 21A which is provided with a pressure control valve 25A. The housing 31 is formed therein with a plurality of ports 32A, 32B, 33A and 33B on the side of the hydraulic source, a pair of ports 34A and 34B on the motor side, a spool sliding bore 35, and a central hydraulic-fluid groove 36 and left- and right-hand hydraulic-fluid grooves 37A, 37B, 38A and 38B, which are spaced from each other axially of the spool sliding bore 35. A pair of hydraulic-fluid grooves 40A and 40B are formed adjacent to respective ends of the spool sliding bore 35, and are closed respectively by closures 39A and 39B.

A hollow spool 41 is slidably fitted in the spool sliding bore 35. A central land 42, and a pair of left- and right-hand lands 43A and 43B, which are spaced axially from the central land 42, are formed at respective locations of the outer periphery of the spool 41. The lands 43A and 43B are formed respectively with a pair of notches 44A and 44B which allow the hydraulic-fluid grooves 37A, 37B to communicate with the hydraulic-fluid grooves 38A, 38B, respectively, when the pressure control valve 25A is at the restriction regions $S_R$ and $S_L$ (refer to FIG. 1). Furthermore, the spool 41 is formed with restrictors 45A and 45B on the lands 43A and 43B, the restrictors 45A and 45B corresponding respectively to the restrictors 24A and 24B which have been described with reference to the aforesaid first embodiment. The restrictors 45A and 45B introduce the hydraulic fluid from the ports 33A and 33B, respectively, into hydraulic-fluid chambers 40A and 40B, whereby pilot pressure acts upon both ends of the spool 41.

A pair of centering springs 46A and 46B are arranged respectively within the hydraulic-fluid chambers 40A and 40B through stoppers 47A and 47B. The springs 46A and 46B correspond respectively to the springs 23A and 23B which have been described with reference to the first embodiment. The springs 46A and 46B act to normally bias the spool 41 to the neutral position N. Further, the stoppers 47A and 47B are normally abutted against both ends of the spool 41 under the biasing forces of the springs 46A and 46B, to restrict a full-stroke position of the spool 41. Furthermore, a pair of plugs 48A and 48B are located radially inwardly of the lands 43A and 43B of the spool 41. The interior space has its ends closed by the plugs 48A and 48B.

The central land 42 of the spool 41 is formed therein with a pair of hydraulic-fluid bores 49A and 49B extending radially, and a pair of hydraulic-fluid bores 50A and 50B which are located in spaced relation to the hydraulic-fluid bores 49A and 49B to the left and right, and which extend obliquely. The hydraulic-fluid bores 50A and 50B normally communicate respectively with the ports 32A and 32B through the hydraulic-fluid grooves 37A and 37B. Moreover, the hydraulic-fluid bores 49A and 49B communicate with the auxiliary line 30 through the hydraulic-fluid groove 36 when the spool 41 is in the neutral position N. When the spool 41 is slidingly moved to the left and right, at least one of the hydraulic-fluid bores 49A and 49B communicates with the auxiliary line 30. The hydraulic-fluid bores 49A, 49B, 50A and 50B cooperate with the spool 41, a stepped piston 51 to be described subsequently, and the like, to form an auxiliary control valve 59A which is integrated with the pressure control valve 25A.

The stepped piston 51 is slidably fitted in a space between the plugs 48A and 48B within the spool 41. The stepped piston 51 cooperates with a pair of springs 52A and 52B and the like arranged between the plugs 48A and 48B, to form a low-pressure selecting valve 26A. The stepped piston 51 has its axially intermediate portion which is formed therein with an annular groove 53 whose length is longer than the spacing dimension between the hydraulic-fluid bores 49A and 49B and whose length is shorter than the spacing dimension between the hydraulic-fluid bores 50A and 50B. Further, the pilot pressure is supplied to both ends of the stepped piston 51 through a pair of hydraulic-fluid bores 54A and 54B which are formed radially in the spool 41. The hydraulic-fluid bores 54A and 54B form parts of the pilot lines 28A and 28B which have been described with reference to the first embodiment.

Thus, the present embodiment constructed as described above can also produce advantages substantially similar to those of the aforementioned first embodiment. Particularly, in the present embodiment, since the stepped piston 51 and the like are arranged within the spool 41 of the pressure control valve 25A, thereby forming the low-pressure selecting valve 26A, the latter is incorporated in the pressure control valve 25A, whereby the entire system can be formed compact, making it possible to save the space.

Third Embodiment

A third embodiment of the invention will be described with reference to FIGS. 5 and 6. The present embodiment is arranged such that a hydraulic motor of variable displacement type is used as the aforesaid hydraulic motor, and displacement of the hydraulic motor is controlled by the hydraulic fluid from the auxiliary line. In the figure, constitutional elements identical with those of the first embodiment are designated by the same reference numerals, and the description of the identical constitutional elements will be omitted.

Figure 5:
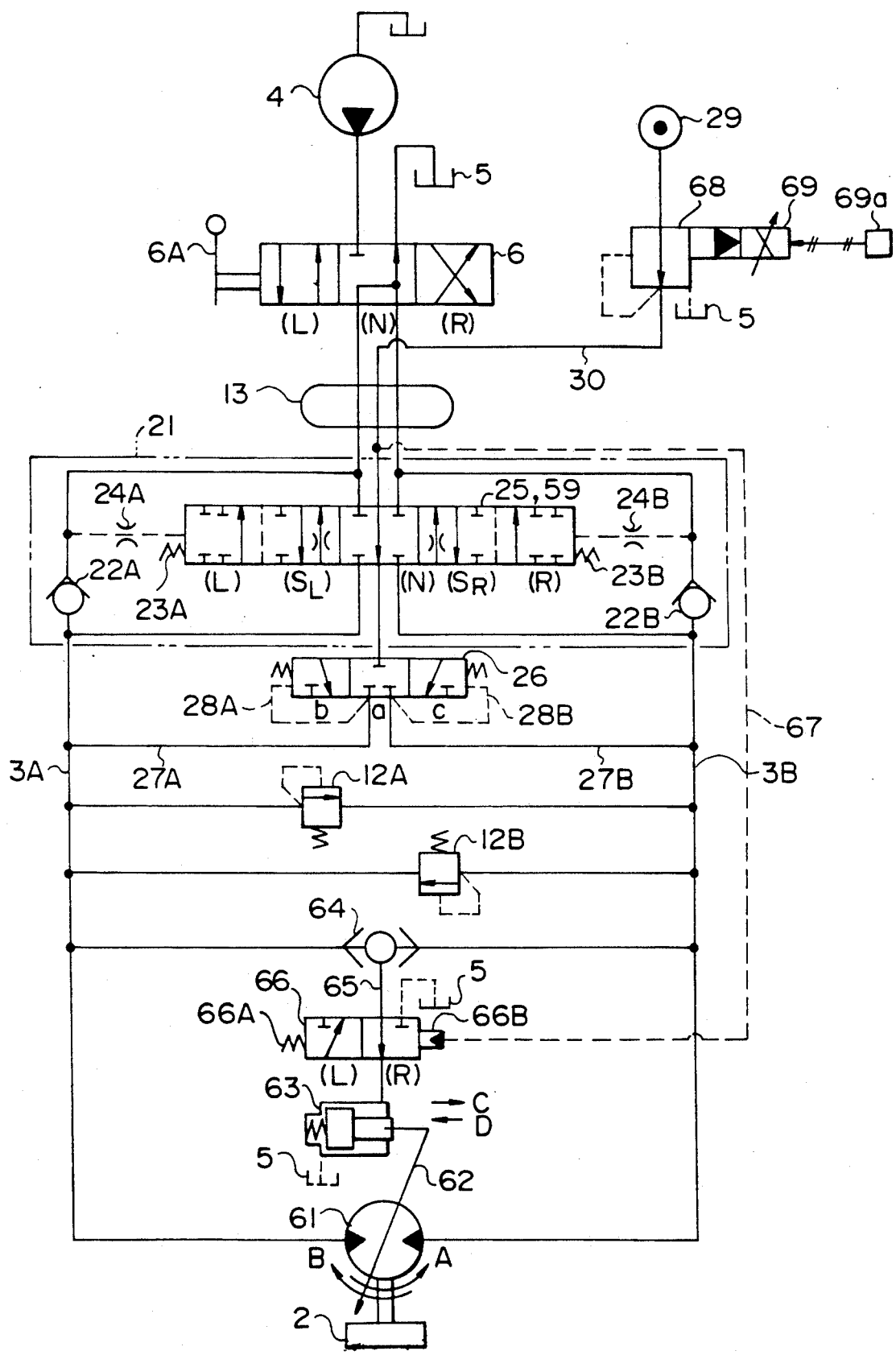
FIG. 5 is a schematic view of a hydraulic-motor drive circuit system according to a third embodiment of the invention.
Figure 6:
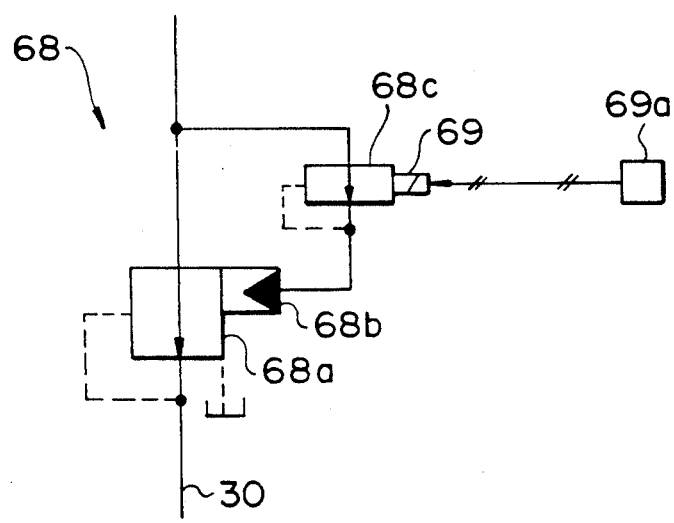
FIG. 6 is a view showing, in detail, a structure of a solenoid proportional pressure-reducing valve shown in FIG. 5.

In FIG. 5, the reference numeral 61 denotes a hydraulic motor of variable displacement type which is connected to the hydraulic pump 4 and the reservoir 5 through the main lines 3A and 3B. The hydraulic motor 61 has a variable displacement element 62 which is driven to tilt in directions indicated by the arrows C and D by a servo actuator 63 to switch the displacement of the hydraulic motor 61 to large displacement and small displacement. A shuttle valve 64 serving as a high-pressure selecting valve is arranged between the counter balance valve 21 and the hydraulic motor 61, and between the main lines 3A and 3B. The shuttle valve 64 selects one of the hydraulic fluids on the high-pressure side in the main lines 3A and 3B to supply the hydraulic fluid to a line 65 which is connected to the servo actuator 63.

A displacement control valve 66 is provided in the line 65, and has a spring 66A and a hydraulic pilot section 66B at both left- and right-hand ends. The spring 66A is set to provide a switching pressure $P_A$. Further, the hydraulic pilot section 66B of the displacement control valve 66 is connected to a control line 67 to be described subsequently. When the pilot pressure from the control line 67 is reduced to less than the switching pressure $P_A$, the displacement control valve 66 is switched from the small-displacement position R to the large-displacement position L. The displacement control valve 66 causes the servo actuator 63 to communicate with the reservoir 5 at the large-displacement position L, thereby driving the servo actuator 63 in the direction indicated by the arrow C. The displacement control valve 66 causes the line 65 to communicate with the servo actuator 63 at the small-displacement position R, thereby driving the servo actuator 63 in the direction indicated by the arrow D. Thus, the variable displacement element 62 of the hydraulic motor 61 is controlled in tilting.

The control line 67 branches off from the auxiliary line 30 at a location between the center joint 13 and the counter balance valve 21 to supply the hydraulic fluid from the auxiliary hydraulic source 29 to the hydraulic pilot section 66B of the displacement control valve 66 as pilot pressure.

Further, a solenoid proportional pressure-reducing valve 68 serving as a pressure setting means is arranged at a location adjacent to the auxiliary hydraulic source 29 in the auxiliary line 30. As shown in FIG. 6, the solenoid proportional pressure-reducing valve 68 is composed of a main hydraulic pressure-reducing valve 68a having a hydraulic pilot section 68b, and an auxiliary solenoid proportional valve 68c which produces pilot pressure applied to the hydraulic pilot section 68b. The auxiliary solenoid proportional valve 68c has a solenoid section 69. Applied to the solenoid section 69 is a signal from a displacement selecting switch 69a, which is arranged within an operating room and which is manually operated by an operator. The solenoid proportional pressure-reducing valve 68 constructed in the manner described above functions such that its setting pressure varies depending upon the signal applied to the solenoid section 69 from the switch 69a, so that the pressure (pilot pressure) within the auxiliary line 30 and the control line 67 is controlled to be reduced on the basis of the setting pressure. Thus, the pilot pressure within the control line 67 is controlled to two levels including pressure $P_1$ lower than the switching pressure $P_A$, and pressure $P_2$ higher than the switching pressure $P_A$. The displacement control valve 66 is switched to the small-displacement position R and the large-displacement position L by the pressure $P_1$ and $P_2$ ($P_1 < P_A < P_2$).

Thus, the present embodiment constructed in this manner can also produce advantages substantially similar to those of the aforementioned first embodiment, and particularly, in the present embodiment, the hydraulic fluid within the auxiliary line 30 is introduced into the displacement control valve 66 which is another actuator, through the control line 67, whereby it is possible to control the displacement of the hydraulic motor 61 in switching to the large displacement and the small displacement. Thus, the auxiliary hydraulic source 29 is shared by the control line 67 and the auxiliary line 30, whereby it is possible to prevent cavitation from occurring, without an increase in the number of lines through the center joint 13.

Furthermore, if the setting pressure of the pressure-reducing valve 68 is set to the pressure $P_2$ ($P_2 < P_A$) at inertia rotation of the hydraulic motor 61, the hydraulic fluid from the auxiliary hydraulic source 29 can be replenished at relatively high pressure into the main line 3A or 3B on the low-pressure side through the auxiliary line 30, the low-pressure selecting valve 26 and the like and, further, it is possible to hold the displacement control valve 66 to the small-displacement position R. Thus, the hydraulic motor 61 can be halted under the small displacement condition, making it possible to reduce the pumping action of the hydraulic motor 61 to relieve shock at stoppage.

Fourth Embodiment

A fourth embodiment of the invention will be described with reference to FIG. 7. The present embodiment employs a backflow preventing valve which is composed of a pair of check valves, and which serves as a means for causing the auxiliary line to communicate with one of the pair of main lines on the low-pressure side. In the figure, constitutional elements identical with those of the first embodiment are designated by the same reference numerals, and the description of the identical constitutional elements will be omitted.

Figure 7:
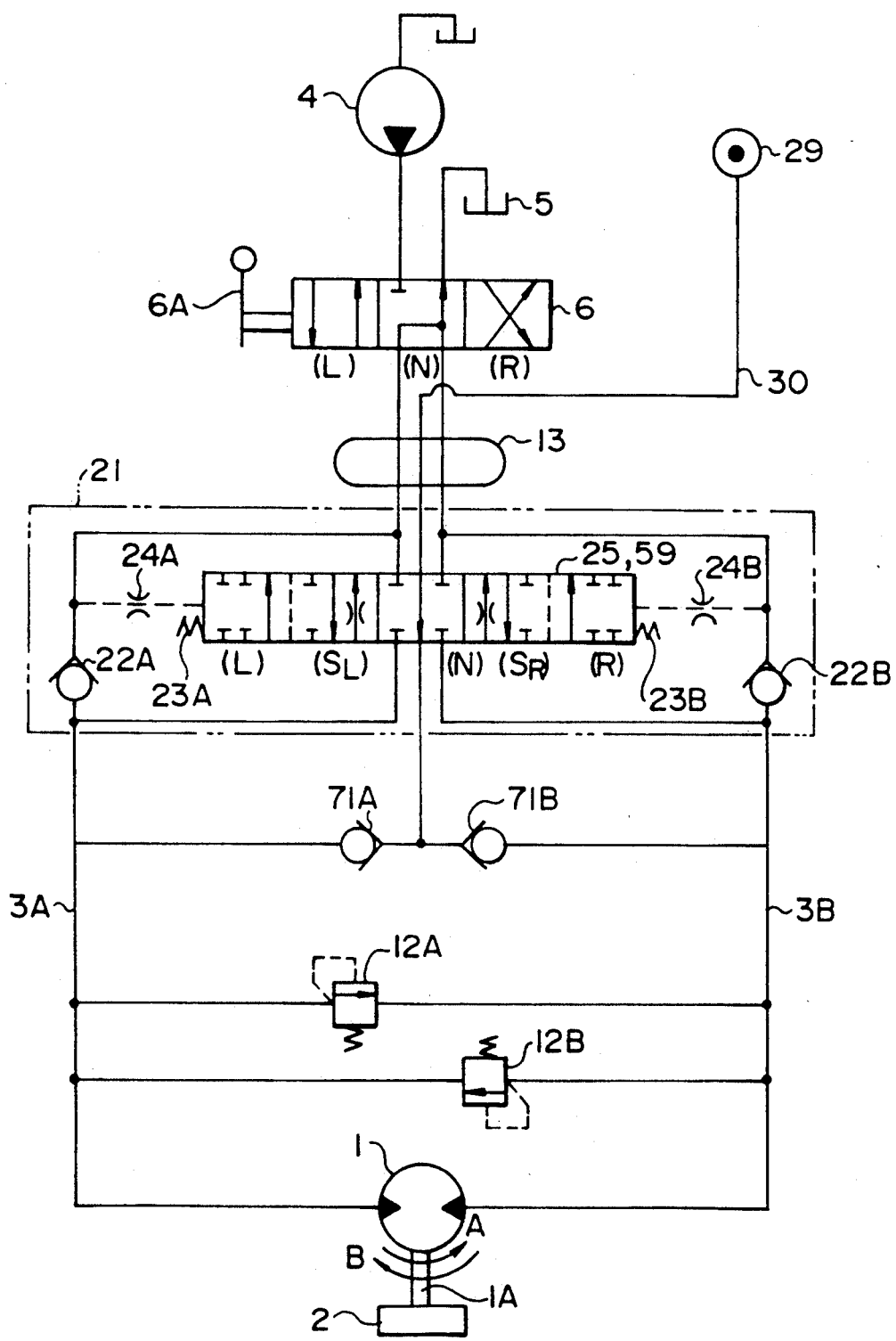
FIG. 7 is a schematic view of a hydraulic-motor drive circuit system according to a fourth embodiment of the invention.

In FIG. 7, the auxiliary line 30 is connected to a pair of check valves 71A and 71B cooperating with each other to form a backflow preventing valve, through the auxiliary control valve 59 which is integrated with the pressure control valve 25. The check valves 71A and 71B are connected respectively to the main lines 3A and 3B at a location between the hydraulic motor 1 and the counter balance valve 21. The check valves 71A and 71B have their respective predetermined opening pressures such that, when the pressure within the main line 3A or 3B is reduced to a value lower by the opening pressure as compared with the pressure within the auxiliary line 30, the check valve 71A or 71B is opened to permit the hydraulic fluid from the auxiliary hydraulic source 29 to be replenished into the main line 3A or 3B, while the hydraulic fluid is prevented from flowing backward from the main line 3A or 3B toward the auxiliary line 30.

Thus, the present embodiment constructed as described above can produce advantages substantially similar to those of the aforesaid first embodiment, and particularly, since the pair of check valves 71A and 71B are employed in the present embodiment in substitution for the low-pressure selecting valve 26 which has been described with reference to the first embodiment, it is possible to simplify the construction.

In connection with the above, although the aforementioned second embodiment is arranged such that the low-pressure selecting valve 26 composed of the stepped piston 51 and the like is incorporated in the spool 41 of the pressure control valve 25, the pair of check valves 71A and 71B may also be incorporated in the spool 41 of the pressure control valve 25.

Further, in the hydraulic circuit system according to the third embodiment, the backflow preventing valve composed of the pair of check valves 71A and 71B may be utilized in place of the low-pressure selecting valve 26.

Fifth Embodiment

A fifth embodiment of the invention will be described with reference to FIGS. 8 and 9. The present embodiment is arranged such that the displacement of the hydraulic motor is automatically switched by another actuator depending upon a drive force. In the figure, constitutional elements identical with those of the third embodiment illustrated in FIG. 5 are designated by the same reference numerals, and the description of the identical constitutional elements will be omitted.

Figure 8:
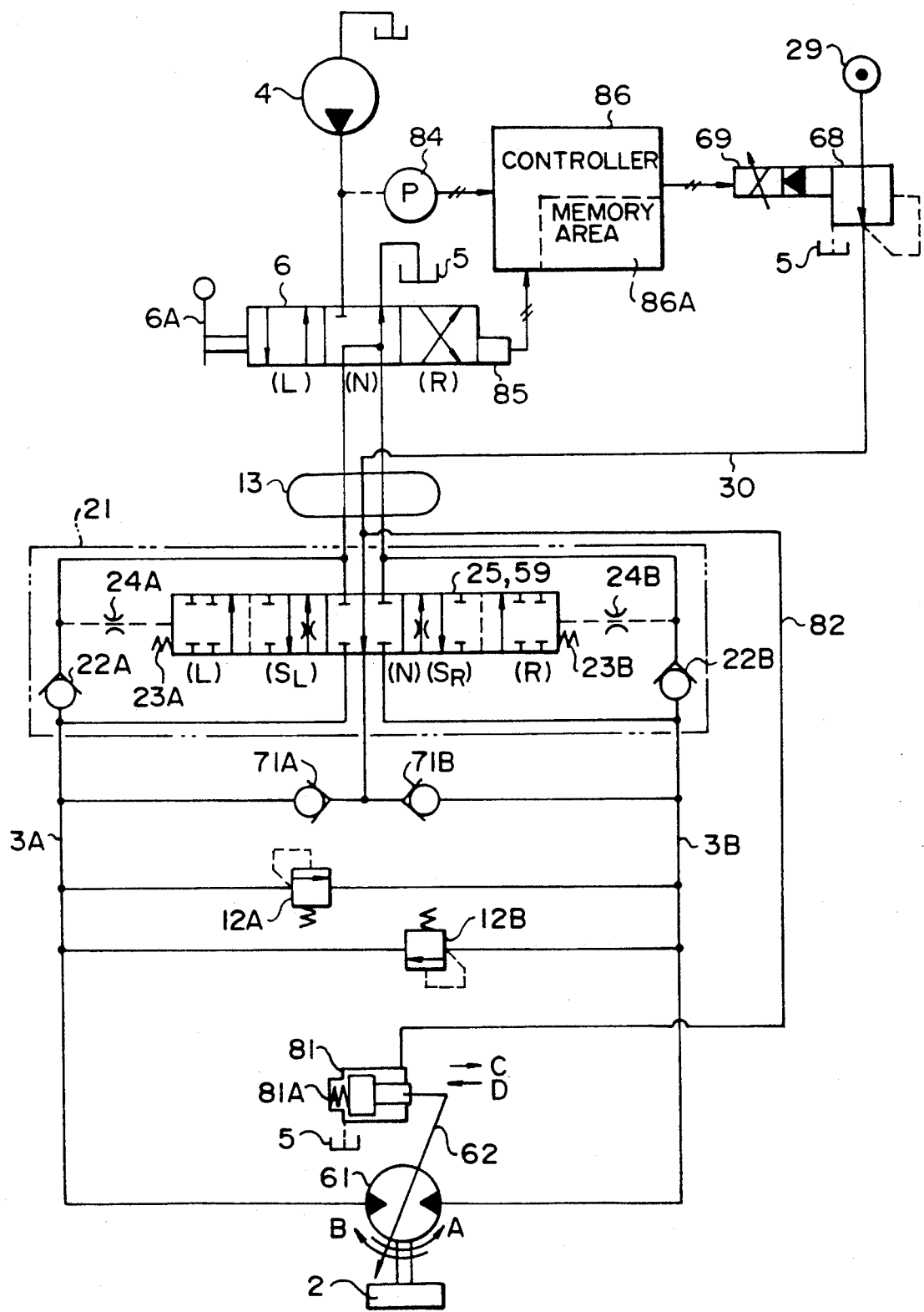
FIG. 8 is a schematic view of a hydraulic-motor drive circuit system according to a fifth embodiment of the invention.
Figure 9:
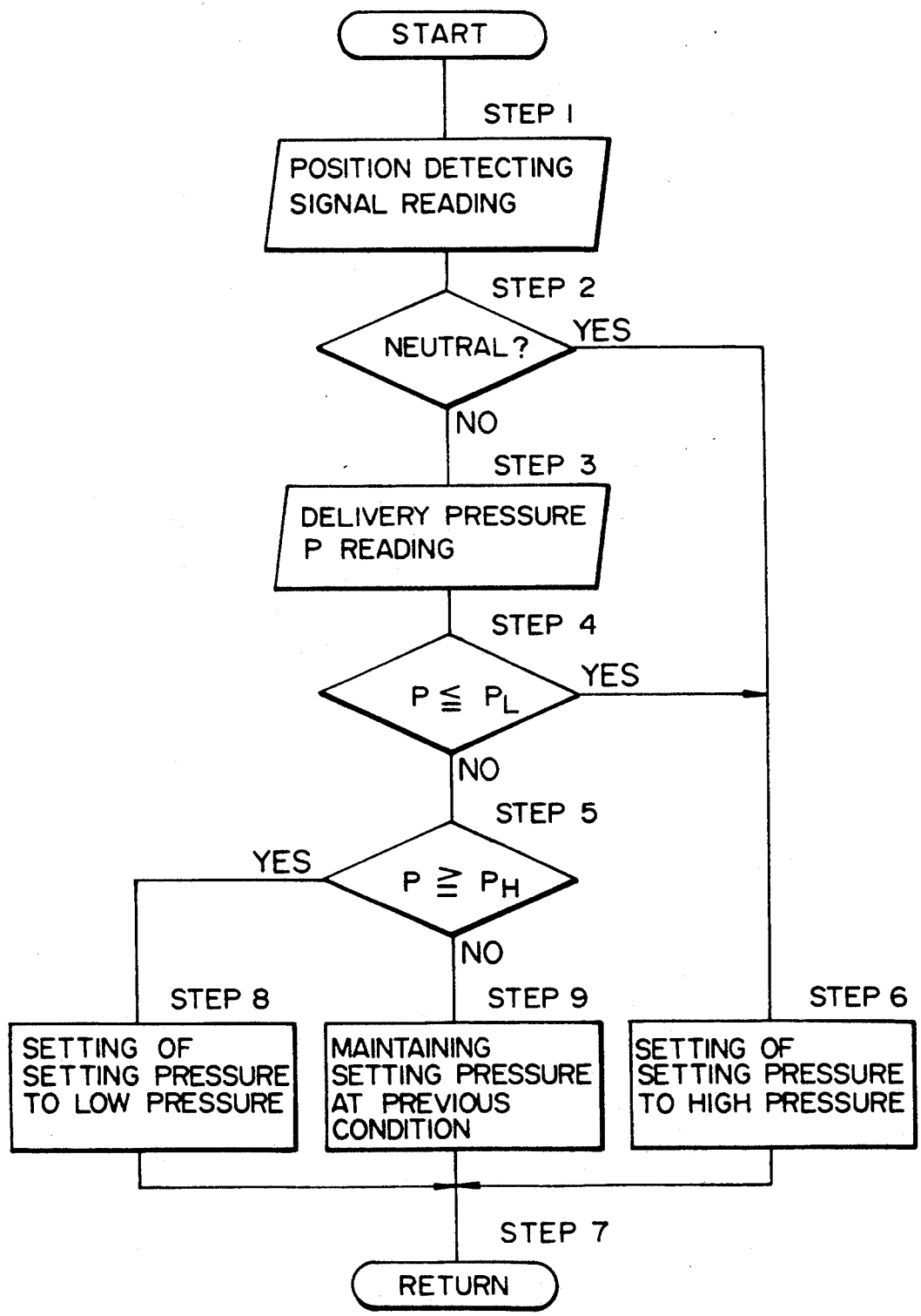
FIG. 9 is a flow chart showing pressure setting control processing in the embodiment illustrated in FIG. 8.

In FIG. 8, the reference numeral 81 denotes a servo actuator, which drives the variable displacement element 62 of the hydraulic motor 61 to tilt in the directions indicated by the arrows C and D. The servo actuator 81 is connected to the auxiliary pump 29 through a control line 82 to be described subsequently and through the auxiliary line 30 and the solenoid proportional pressure-reducing valve 68. It is set to provide a switching pressure $P_A$ by a spring 81A.

The servo actuator 81 drives the variable displacement element 61 in the direction indicated by the arrow C when the control pressure from the control line 82 is a pressure $P_1$ lower than the switching pressure $P_A$ ($P_1 < P_A$) to switch the displacement of the hydraulic motor 61 to the large displacement. When the control pressure becomes a pressure $P_2$ higher than the switching pressure $P_A$ ($P_A < P_2$), the servo actuator 81 drives the variable displacement element 62 to tilt in the direction indicated by the arrow D to switch the displacement of the hydraulic motor 61 to the small displacement.

The control line 82 branches off from the auxiliary line 30 at a location between the center joint 13 and the counter balance valve 21. The control line 82 has its forward end connected to the servo actuator 81 to supply the hydraulic fluid from the auxiliary hydraulic source 29 through the pressure reducing valve 68 to the servo actuator 81 as the control pressure.

A pressure sensor 84 serving as a drive-force detecting means for the hydraulic motor 61 is connected to the delivery line of the hydraulic pump 4. The pressure sensor 84 detects a delivery pressure P of the hydraulic pump 4, which varies depending upon the load pressure (drive pressure) of the hydraulic motor 61, to output a detected signal to a controller 86 to be described subsequently. A position sensor 85 is attached to the directional control valve 6. The position sensor 85 detects whether or not the directional control valve 6 is switched to the neutral position N of the control lever 6A, to output a position-detected signal to the controller 86.

The controller 86 is composed of a microcomputer and the like, and has its input section connected to the pressure sensor 84 and the position sensor 85. An output section of the controller 86 is connected to the solenoid section 69 of the solenoid proportional pressure-reducing valve 68. The controller 86 has a memory circuit in which a program illustrated in FIG. 9 is stored, to perform pressure-setting control processing of the pressure reducing valve 68. Further, the memory circuit of the controller 86 has a memory area 86A, and stored in the memory area 86A is a setting value for discriminating whether or not the delivery pressure P of the hydraulic pump 4 is equal to or lower than the predetermined low pressure $P_L$, or whether or not the delivery pressure P is equal to or higher than the predetermined high pressure $P_H$.

The pressure-setting control processing by the controller will next be described with reference to FIG. 9.

First, when the processing operation starts, the position detecting signal is read from the position sensor 85 at a step 1. At a step 2, it is judged whether or not the directional control valve 6 is returned to the neutral position N. When the judgment indicates "NO", the directional control valve 6 is switched to any one of the operative positions L and R from the position N. Since this indicates the time that the vehicle travels, the program proceeds to a step 3 where the delivery pressure P of the hydraulic pump 4 is read from the pressure sensor 84. At a step 4, it is judged whether or not the delivery pressure P is equal to or lower than the predetermined low pressure $P_L$. When the judgment indicates "YES", the program proceeds to a step 6 because the load pressure of the hydraulic motor 61 is relatively low. At the step 6, the setting pressure of the solenoid proportional pressure-reducing valve 68 is set to the pressure $P_2$ higher than the switching pressure $P_A$ ($P_2 > P_A$). The program is returned at a step 7.

By doing so, the control pressure within the control line 82 is set to a high-pressure level of the order of the pressure $P_2$, whereby the servo actuator 81 drives the variable displacement element 62 of the hydraulic motor 61 to tilt toward the small displacement side in the direction indicated by the arrow D. Accordingly, the hydraulic motor 61 is rotated at high speed with low torque, to allow the vehicle serving as the inertial load 2 to travel to relatively high speed. Thus, when the load pressure acting upon the hydraulic motor 61 is low while the vehicle travels on level land or the like, for example, the traveling speed of the vehicle can automatically be controlled to a high-speed condition.

Furthermore, when the judgment at the step 4 indicates "NO", the program proceeds to a step 5 where it is judged whether or not the delivery pressure P is equal to or higher than the predetermined high pressure $P_H$. If the judgment indicates "YES", this means that the load pressure of the hydraulic motor 61 is under the high condition. Accordingly, the program proceeds to a step 8 where the setting pressure of the pressure reducing valve 68 is set to the pressure $P_1$ lower than the switching pressure $P_A$ ($P_1 < P_A$). The control pressure within the control line 82 is controlled to a low-pressure level of the order of the pressure $P_1$, whereby the servo actuator 81 is operated in the direction indicated by the arrow C by the spring 81A. By doing so, the hydraulic motor 61 is set to the large displacement. Thus, when the load pressure acting upon the hydraulic motor 61 increases when the vehicle climbs a slope or the like, for example, the hydraulic motor 61 is rotated at low speed with high torque, so that it is possible to quickly cope with traveling in up a slope.

On the other hand, when the judgment at the step 5 indicates "NO", the delivery pressure P of the hydraulic pump 4 is within a range of $P_L < P < P_H$. Since the load pressure of the hydraulic pump 61 is under an intermediate condition, the program proceeds to a step 9 where the setting pressure of the pressure reducing valve 68 continues to be held under the previous condition, that is, under the condition of any one of the pressures $P_1$ and $P_2$. Thus, so-called hunting is prevented from occurring in which the servo actuator 81 repeatedly operates in the directions indicated by the arrows C and D.

Furthermore, when the judgment at the step 2 indicates "YES", the directional control valve 6 is returned to the neutral position N in order to halt the hydraulic motor 61, for example. Accordingly, the program proceeds to the step 6, where the setting pressure 3 of the pressure reducing valve 68 is set to the high pressure value $P_2$, whereby the hydraulic fluid from the auxiliary hydraulic source 29 is replenished to any one of the main lines 3A and 3B through the auxiliary line 30, the pressure control valve 25 and the check valve 71A or 71B under the relatively high pressure condition. Thus, it is possible to effectively prevent cavitation from occurring in the main lines 3A and 3B. Since, under this condition, the hydraulic motor 61 is set to the small-displacement condition, the pumping action of the hydraulic motor 61 is reduced to enable shock at stoppage to be relieved.

Moreover, there is a case where, when the directional control valve 6 is abruptly returned to the neutral position N from the operative position L or R, confining pressure due to a hydraulic-fluid impact phenomenon occurs between the hydraulic pump 4 and the directional control valve 6. In this case, however, the setting pressure of the pressure reducing valve 68 is set to the high-pressure value $P_2$ by processing at the steps 2 and 6 as shown in FIG. 9, regardless of the delivery pressure P from the hydraulic sensor 84. Accordingly, it is possible to avoid the case where the delivery pressure P is brought to be equal to or higher than the high pressure $P_H$ by the confining pressure, and the setting pressure of the pressure reducing valve 68 is set to the low-pressure value (refer to the steps 5 and 8). Thus, it is possible to control the setting pressure of the pressure reducing valve 68 in an optimum manner without affecting or influencing the confining pressure.

Thus, the present embodiment constructed as described above can produce advantages substantially similar to those of the aforesaid third embodiment, and particularly, in the present embodiment, the displacement of the hydraulic motor 61 can automatically be switched depending upon the load pressure, making it possible to sharply improve operability at the time the construction machine, such as a hydraulic excavator or the like, travels and is halted.

In connection with the above fifth embodiment, the pressure sensor 84 for detecting the delivery pressure P of the hydraulic pump 4 is provided as a means for detecting the drive force of the hydraulic motor 61. However, the drive-force detecting means is not limited to the one described above. For example, if the hydraulic pump 4 is formed by a hydraulic pump of variable displacement type, a variable displacement element of the hydraulic pump is driven to tilt depending upon the delivery pressure and, accordingly, a tilting-angle sensor for detecting a tilting angle of the variable displacement element may be used as the drive-force detecting means.

Further, in the fifth embodiment, it has been described that the position sensor 85 serving as the position detecting means is attached to the directional control valve 6. In place of this arrangement, however, the position sensor 85 may be attached to the side of the control lever 6A to detect the tilting position of the control lever 6A.

Sixth Embodiment

A sixth embodiment of the invention will be described with reference to FIGS. 10 and 11. The present embodiment is arranged such that pressure at a location between the directional control valve and the counter balance valve is detected, and displacement of the hydraulic motor is automatically switched on the basis of the detected pressure. In the figure, constitutional elements identical with those of the fifth embodiment illustrated in FIG. 8 are designated by the same reference numerals, and the description of the identical constitutional elements will be omitted.

Figure 10:
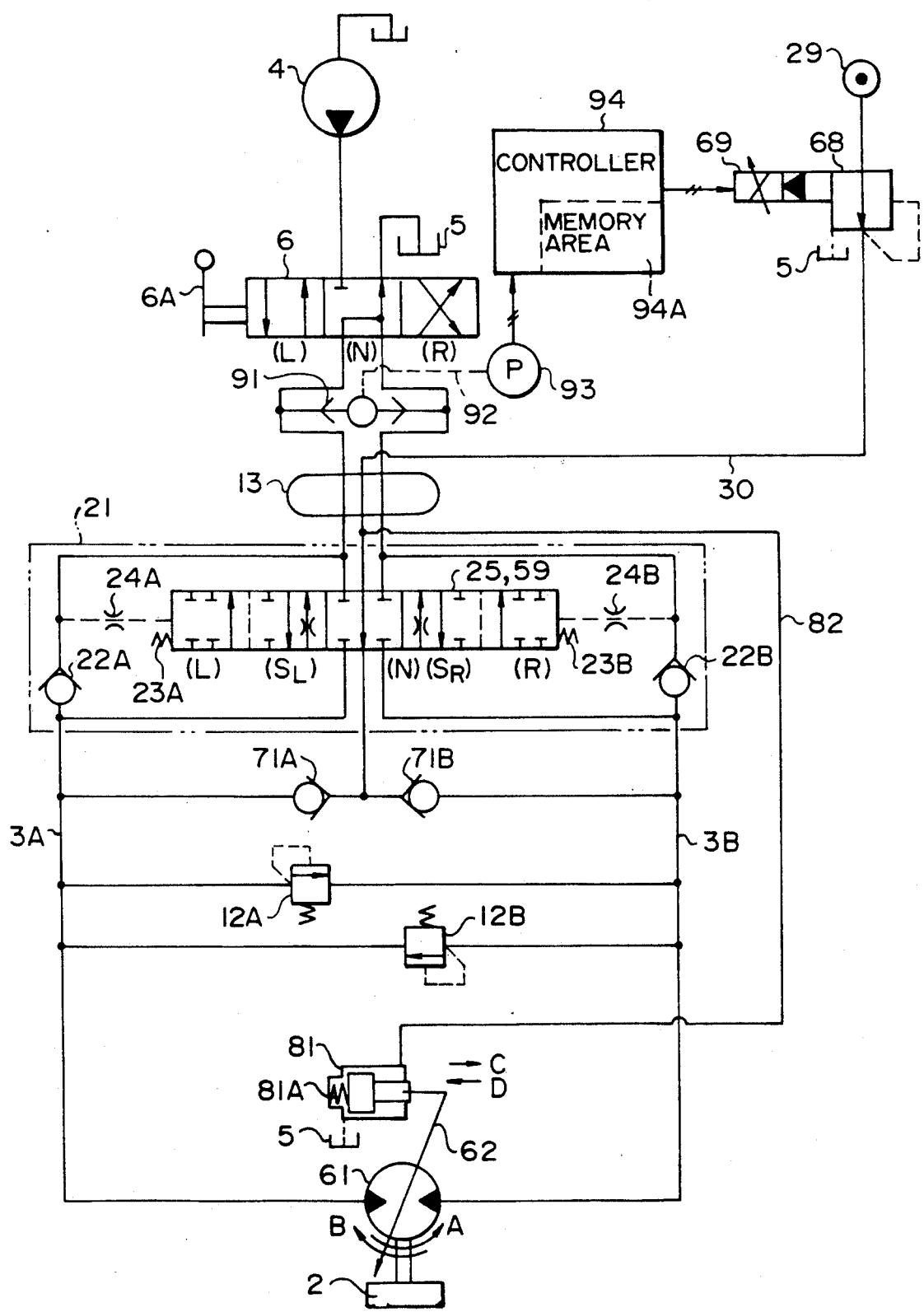
FIG. 10 is a schematic view of a hydraulic-motor drive circuit system according to a sixth embodiment of the invention.
Figure 11:
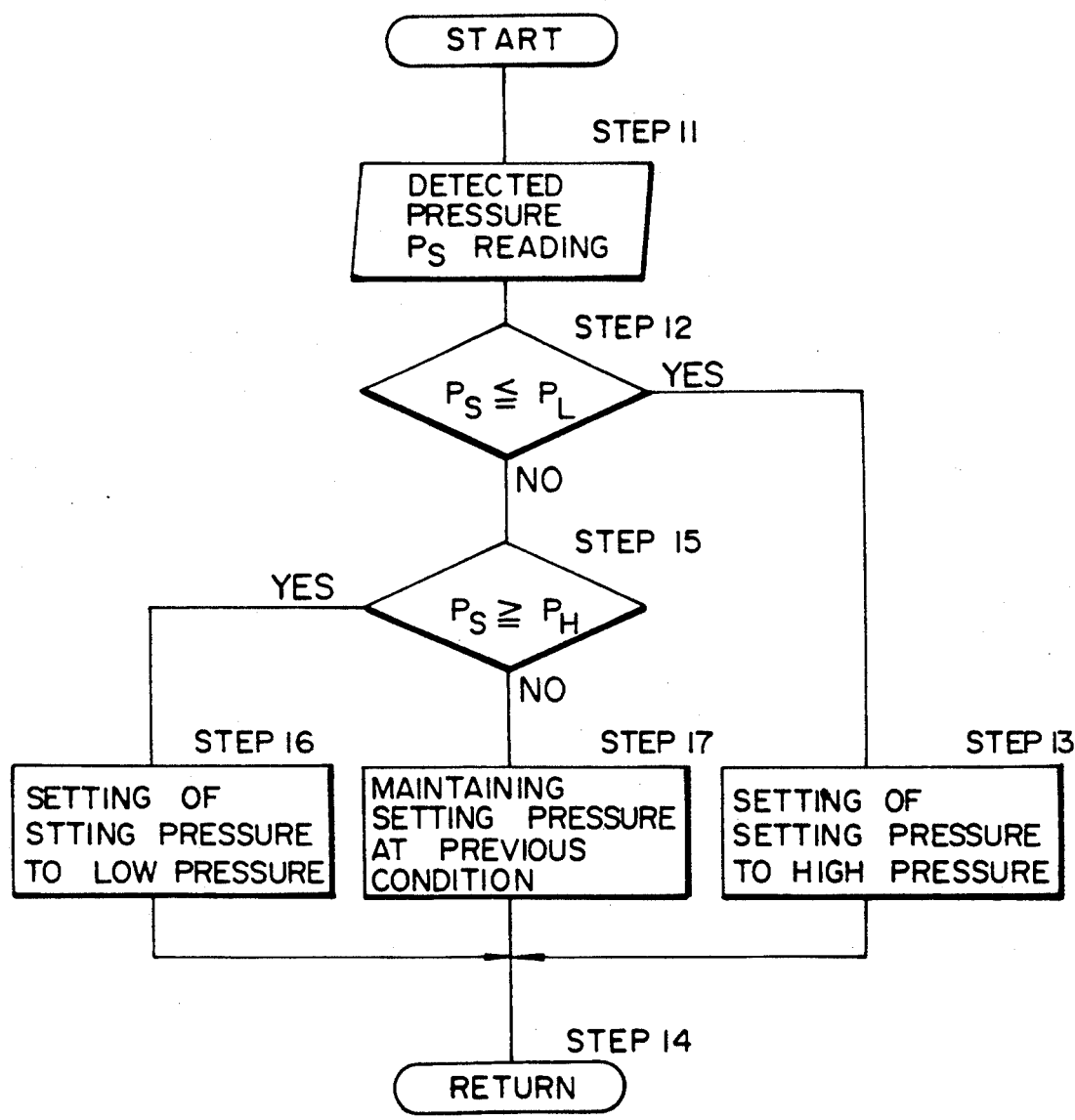
FIG. 11 is a flow chart showing pressure-setting control processing in the embodiment illustrated in FIG. 10.

In FIG. 10, the reference numeral 91 denotes a shuttle valve serving as a high-pressure selecting valve, which is located between the directional control valve 6 and the counter balance valve 21, and between the main lines 3A and 3B. The shuttle valve 91 selects the pressure of the hydraulic fluid in one of the main lines 3A and 3B on the high-pressure side to induce the pressure into an inducing line 92. A pressure sensor 93 is connected to the inducing line 92. The pressure sensor 93 detects the pressure in one of the main lines 3A and 3B on the high-pressure side, which is selected by the shuttle valve 91, to output the detected pressure $P_s$ to a controller 94.

The controller 94 is composed of a microcomputer and the like, and has its input section connected to the pressure sensor 93. An output section of the controller 94 is connected to the solenoid section 69 of the solenoid proportional pressure-reducing valve 68. The controller 94 has a memory circuit in which a program illustrated in FIG. 11 is stored, to perform pressure-setting control processing of the pressure reducing valve 68. Further, the memory circuit of the controller 94 has a memory area 94A, in which is stored a setting value for discriminating whether or not the detected pressure $P_s$ from the pressure sensor 93 is equal to or lower than the predetermined low pressure $P_L$, or whether or not the detected pressure $P_s$ is equal to or higher than the predetermined high pressure $P_H$.

The pressure-setting control processing by the controller 94 will next be described with reference to FIG. 11.

First, when the processing operation starts, the detected pressure $P_s$ is read from the pressure sensor 93 at a step 11. The program proceeds to a step 12, where it is judged whether or not the detected pressure $P_s$ is equal to or lower than the predetermined low pressure $P_L$. If the judgment indicates "YES", this indicates the time that the directional control valve 6 is in the illustrated neutral position N, or the time that the directional control valve 6 is switched to the operative positions L are R, and the load pressure of the hydraulic motor 61 is relatively small. Accordingly, the program proceeds to a step 13 where the setting pressure of the solenoid proportional pressure-reducing valve 68 is set to the pressure $P_2$, which is higher than the switching pressure $P_A$ ($P_2 > P_A$). The program is returned at a step 14.

By doing so, the control pressure within the control line 82 is set to the high-pressure level of the pressure $P_2$, whereby the servo actuator 81 is driven to tilt in the direction indicated by the arrow D toward the small displacement side.

Accordingly, during traveling of the vehicle due to the switching operation of the directional control valve 6, the hydraulic motor 61 is rotated at high speed with low torque, to allow the vehicle serving as the inertia load 2 to travel at relatively high speed. Thus, when the load pressure acting upon the hydraulic motor 61 is small, such as when the vehicle travels on level land or the like, for example, it is possible to automatically control the traveling speed of the vehicle to the high-speed condition.

When the directional control valve 6 is returned to the neutral position N to halt the vehicle, the setting pressure of the pressure reducing valve 68 is also brought to the high pressure setting, so that the hydraulic motor 61 can be halted under the small displacement condition. Further, the hydraulic fluid from the auxiliary hydraulic source 29 can be replenished into the main line 3A or 3B on the low pressure side through the auxiliary line 30, the pressure control valve 25 and the check valve 71A or 71B under the high pressure condition. Thus, it is possible to effectively prevent cavitation from occurring at inertia rotation of the hydraulic motor 61.

Particularly, a condition under which the hydraulic motor 61 is liable to be inertially rotated by the inertia load 2 indicates that the vehicle tends to be halted while traveling at high speed while the load pressure of the hydraulic motor 61 is small and the hydraulic motor 61 is rotated at high speed. Accordingly, by setting the pressure reducing valve 68 to the high pressure so that the hydraulic motor 61 is halted under the small displacement condition, the hydraulic fluid at the high pressure can be replenished into the main line 3A and 3B on the low pressure side, whereby a high cavitation-preventing function can be given, while the pumping action of the hydraulic motor 61 can be made small, so that shock at stoppage can be relieved effectively.

Furthermore, if the judgment at the step 12 indicates "NO", the program proceeds to a step 15, where it is judged whether or not the detected pressure $P_s$ is equal to or higher than the predetermined high pressure $P_H$. If the judgment indicates "YES", this indicates that the load pressure of the hydraulic motor 61 is under the high condition. Accordingly, the program proceeds to a step 16, where the setting pressure of the pressure reducing valve 68 is set to the pressure $P_1$, which is lower than the switching pressure $P_A$ ($P_1 < P_A$), and the control pressure within the control line 82 is controlled to the low pressure level of the pressure $P_1$, thereby operating the servo actuator 81 in the direction indicated by the arrow C under the biasing force of the spring 81A. By doing so, the hydraulic motor 61 is set to the large displacement. Accordingly, when the load pressure acting upon the hydraulic motor 61 increases, such as when the vehicle travels up a slope or the like, for example, the hydraulic motor 61 is rotated at low speed with high torque, so that it is possible to quickly cope with traveling on a slope and the like.

On the other hand, if the judgment at the step 15 indicates "NO", the detected pressure $P_s$ of the pressure sensor 93 is within a range of $P_L < P_s < P_H$, and the load pressure of the hydraulic motor 61 is under the intermediate condition. Accordingly, the program proceeds to a step 17 where the setting pressure of the pressure reducing valve 68 continues to be held under the previous condition, that is, under the condition of any one of the pressures $P_1$ and $P_2$. By doing so, so-called hunting is prevented from occurring, in which the servo actuator 81 repeatedly operates in the directions indicated by the arrows C and D.

Thus, the present embodiment constructed as described above can also produce advantages substantially similar to those of the fifth embodiment, and particularly, the present embodiment can produce the following advantages. That is, the position sensor 85 and the like described with reference to the fifth embodiment can be dispensed with, making it possible to simplify the setting control processing. Further, only the load pressure, which is actually required for the hydraulic motor 61, can be caught by the pressure sensor 93.

In connection with the above fifth and sixth embodiments, the pair of check valves 71A and 71B, serving as the backflow preventing valve, are connected to the other end of the auxiliary line 30 through the pressure control valve 25. In place of the check valves 71A and 71B, however, the low-pressure selecting valve 26 may be provided, which has been described with reference to the first through third embodiments. In this case, it is also possible to replenish the hydraulic fluid into the main lines 3A and 3B through the low-pressure selecting valve 26.

Seventh Embodiment

A seventh embodiment of the invention will be described with reference to FIG. 12. In the figure, constitutional elements identical with those of the first embodiment are designated by the same reference numerals, and the description of the identical constitutional elements will be omitted.

In each of the embodiments described previously, the auxiliary control valve 59 is integrated with the pressure control valve 25 of the counter balance valve 21. In the present embodiment, however, an auxiliary control valve is provided separately.

Figure 12:
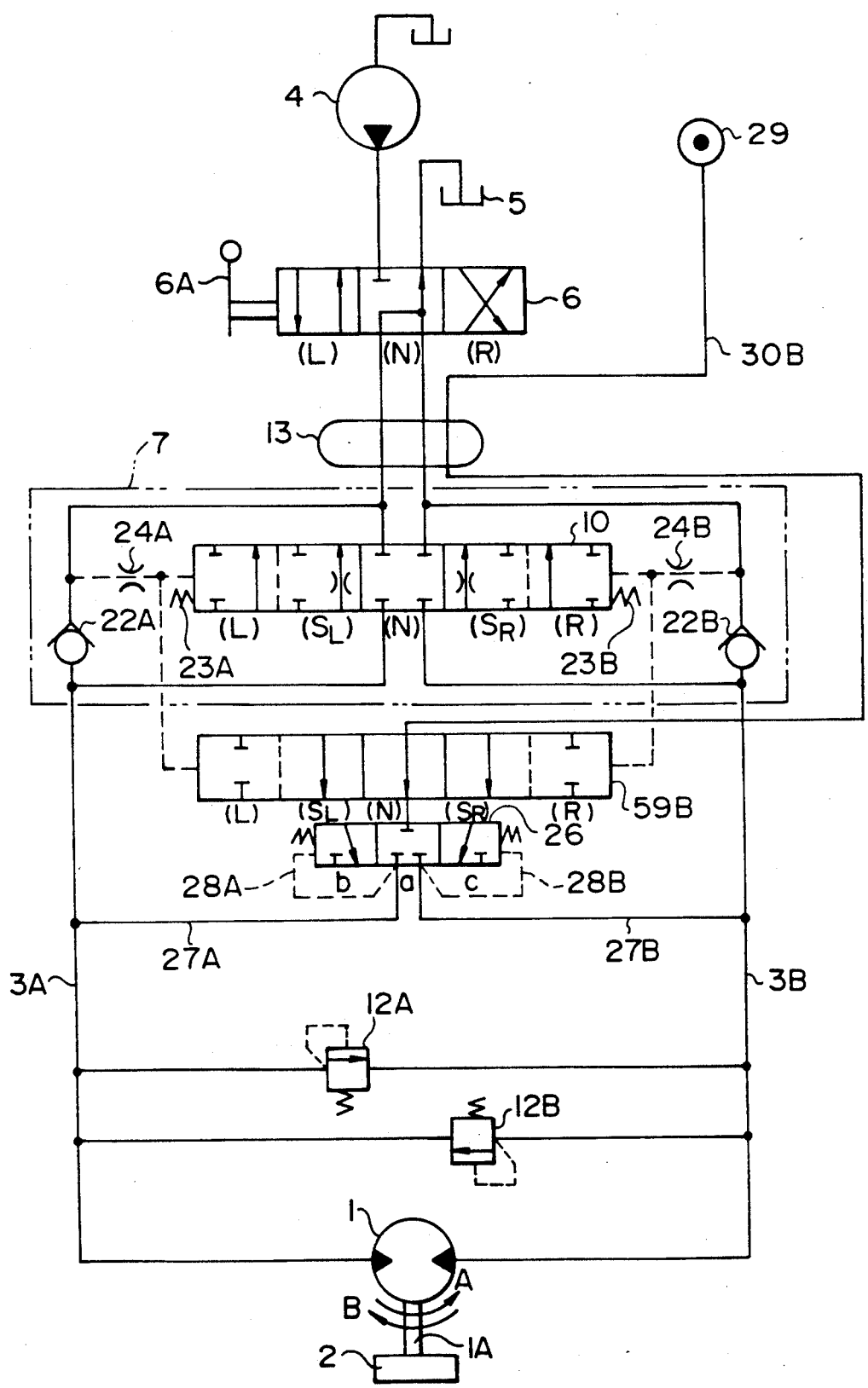
FIG. 12 is a schematic view of a hydraulic-motor drive circuit system according to a seventh embodiment of the invention.

In FIG. 12, a counter balance valve 7 is provided with an ordinal or normal pressure control valve 10. An auxiliary control valve 59B of hydraulic pilot type for opening and closing an auxiliary line 30B is arranged on the outside of the pressure control valve 10. Pilot pressure is supplied to the auxiliary control valve 59B through the restrictors 24A and 24B, so that the auxiliary control valve 59B is interlocked with operation of the pressure control valve 10 to perform switching control.

In the present embodiment, when the pressure control valve 10 is switched to the left- and right-hand operative positions L and R, the auxiliary line 30B also can be cut off by the auxiliary control valve 59B. When the pressure control valve 10 is in the neutral position N and the restriction regions $S_L$ and $S_R$, the auxiliary line 30B is caused to communicate with the low-pressure selecting valve 26 by the auxiliary control valve 59B. Thus, it is possible for the present embodiment to produce advantages similar to those of the first embodiment.

Eighth Embodiment

An eighth embodiment of the invention will be described with reference to FIGS. 13 through 15. In the figures, constitutional elements identical with those of the first embodiment illustrated in FIG. 1 are designated by the same reference numerals, and the description of the identical constitutional elements will be omitted.

Figure 13:
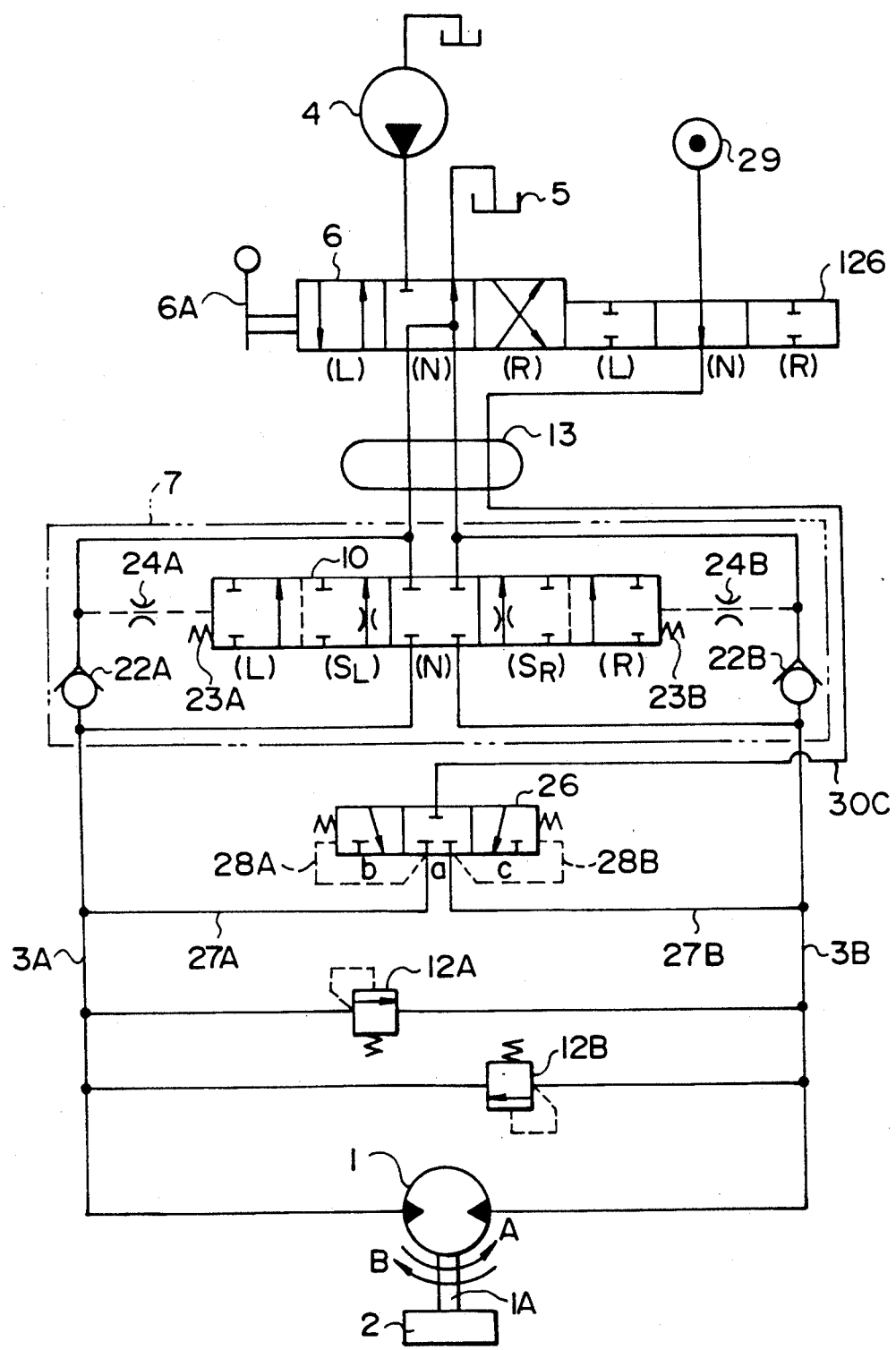
FIG. 13 is a schematic view of a hydraulic-motor drive circuit system according to an eighth embodiment of the invention, showing a condition in which the hydraulic motor is halted.

In FIG. 13, the reference numeral 30C denotes an auxiliary line whose one end is connected to the auxiliary hydraulic source 29. The other end of the auxiliary line 30C is connected to the low-pressure selecting valve 26 through an auxiliary control valve 126, to be described subsequently, and through the center joint 13. When the hydraulic motor 1 continues to be rotated inertially, the hydraulic fluid from the auxiliary hydraulic source 29 is replenished into the main line 3A or 3B on the low pressure side. Further, when the auxiliary control valve 126 is switched from a communication position N to a cutting-off position L or R as illustrated in FIG. 14, the hydraulic fluid from the auxiliary hydraulic source 29 is cut off with respect to the low-pressure selecting valve 26 so that replenishment of the hydraulic fluid from the auxiliary hydraulic source 29 is halted.

The auxiliary control valve 126 is integrated with the directional control valve 6, and is switched in interlocking fashion with the directional control valve 6. When the directional control valve 6 is in the neutral position N, the auxiliary control valve 126 is brought to the communication position N, while, when the directional control valve 6 is switched to the operative positions L and R, the auxiliary control valve 126 is switched to the cutting-off positions L and R. At the communication position N, the auxiliary control valve 126 allows the hydraulic fluid from the auxiliary hydraulic source 29 to be supplied to the low-pressure selecting valve 26 through the auxiliary line 30C, while, at the cutting-off positions L and R, the auxiliary control valve 126 cuts off supply of the hydraulic fluid, so that the pressure within the auxiliary lines 30C can be varied in a two-step manner.

The fundamental or basic operation relating to the counter balance valve 7 of the hydraulic-motor drive circuit system according to the invention is not remarkably different from that of the prior art.

However, the present embodiment is arranged such that the directional control valve 6 is integrated with the auxiliary control valve 126, which is provided in the auxiliary line 30C, so that the auxiliary control valve 126 is switched in interlocking fashion with the directional control valve 6. The present embodiment is also arranged such that the low-pressure selecting valve 26 is provided between the hydraulic motor 1 in the main lines 3A and 3B and the counter balance valve 7 through the lines 27A and 27B, and the auxiliary hydraulic source 29 is connected to the low-pressure selecting valve 26 through the auxiliary line 30C. Thus, the following advantages can be produced.

Figure 14:
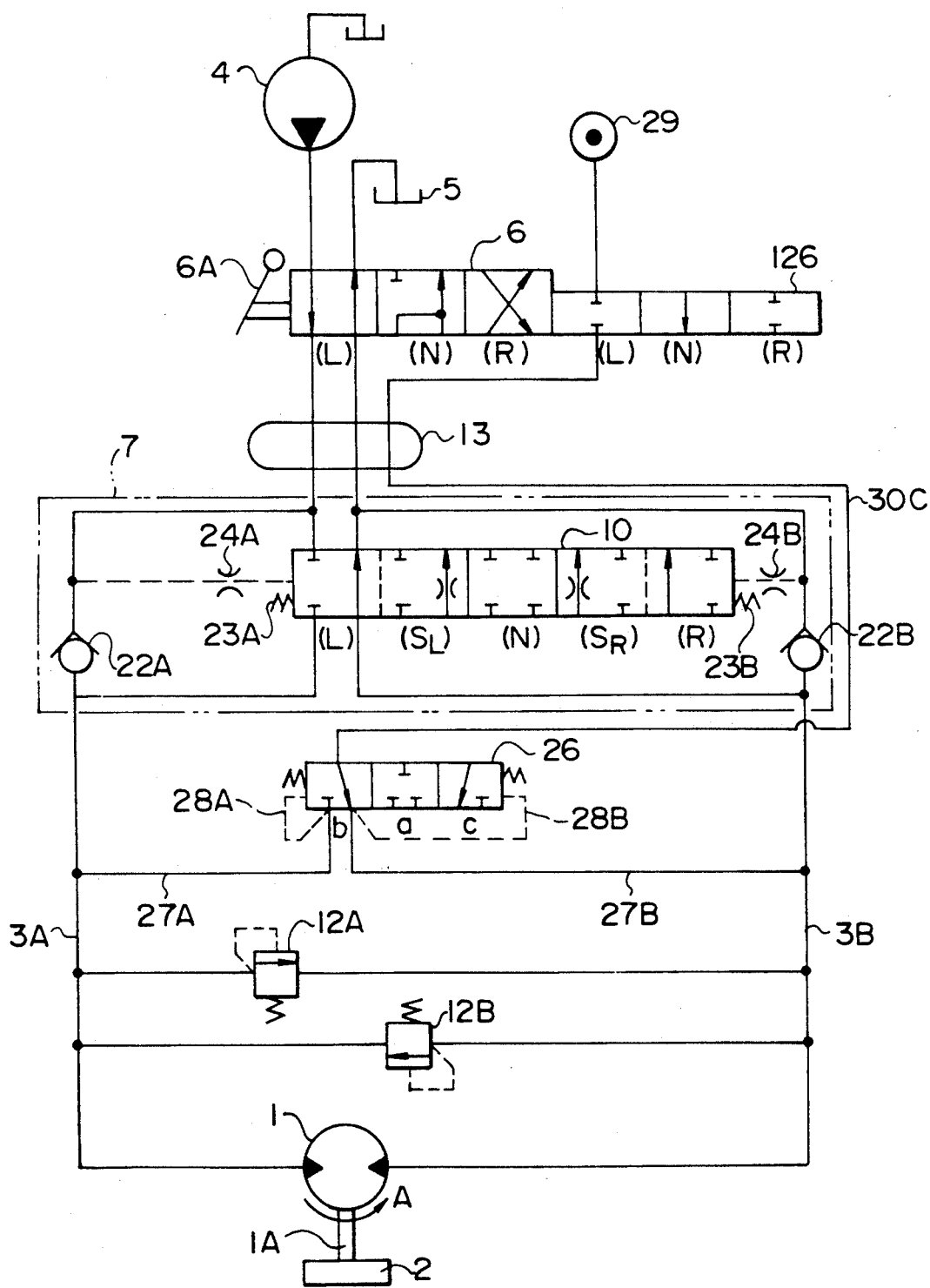
FIGS. 14 and 15 are views of a condition of the hydraulic-motor drive circuit system shown in FIG. 13, respectively showing the time the hydraulic motor is rotated steadily and the time the hydraulic motor is rotated inertially.

First, as shown in FIG. 14, the directional control valve 6 is switched from the neutral position N to the operative position L, the pressure control valve 10 is switched from the neutral position N to the operative position L, and the hydraulic motor 1 is rotatively driven in the direction indicated by the arrow A. At this time, the side of the main line 3A is brought to high pressure, while the side of the main line 3B is brought to low pressure. The low-pressure selecting valve 26 causes the auxiliary line 30C to communicate with the main line 3B on the low pressure side through the line 37B at the operative position b. At this time, the auxiliary control valve 126 is interlocked with the directional control valve 6 and is switched from the communication position N to the cutting-off position L to cut off the auxiliary hydraulic source 29 from the low-pressure selecting valve 26. Accordingly, the hydraulic fluid from the auxiliary hydraulic source 29 can be prevented from flowing into the main line 3B, making it possible to effectively prevent the hydraulic fluid from being wastefully consumed during steady rotation of the hydraulic motor 1. This is also similar to the case where the directional control valve 6 is switched to the operative position R.

Figure 15:
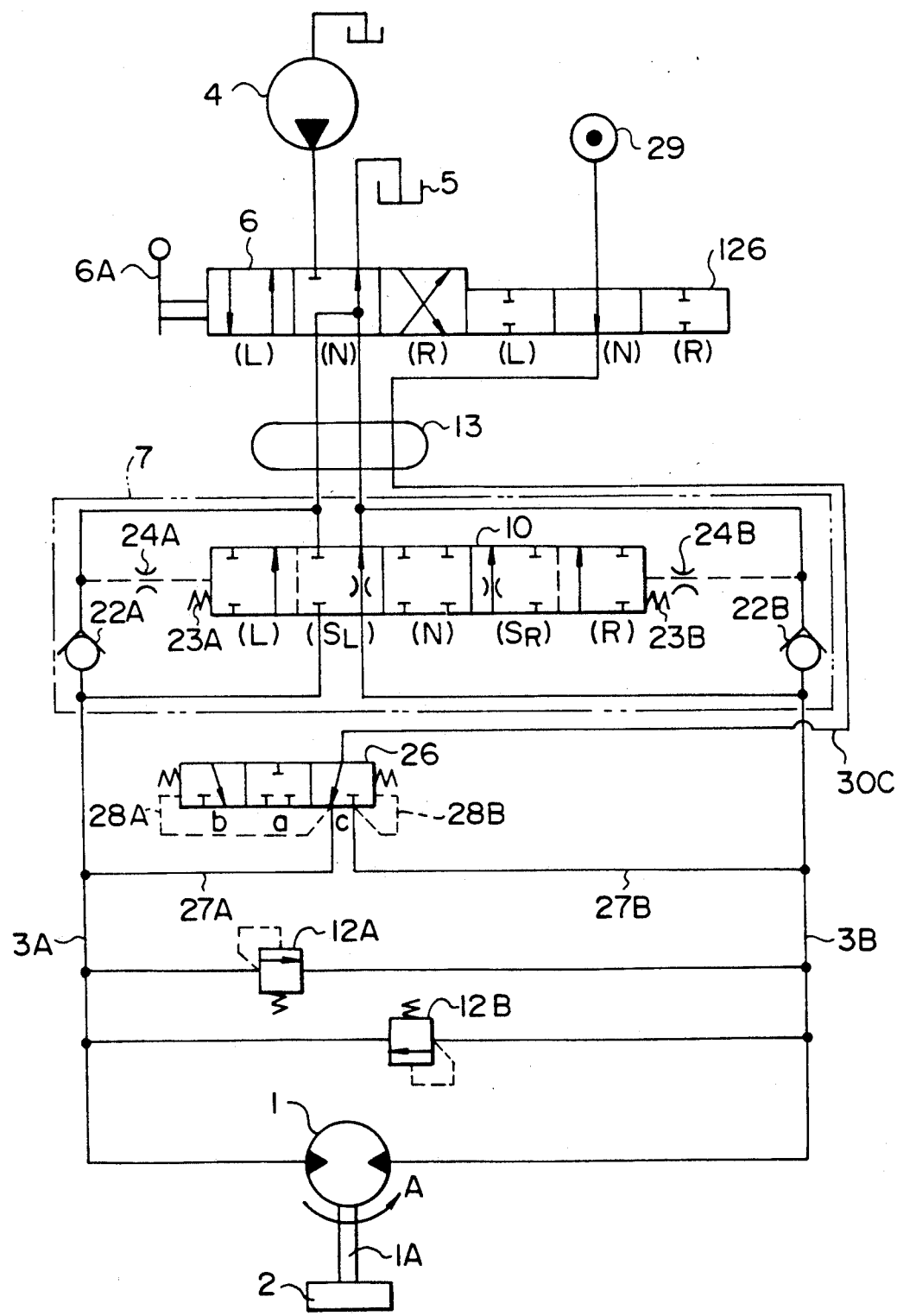

Furthermore, when the directional control valve 6 is returned to the neutral position N as shown in FIG. 15, the pressure control valve 10 reaches the restriction region $S_L$ while returning to the neutral position N from the operative position L, and the hydraulic motor 1 may continue to be inertially rotated in the direction indicated by the arrow A. At this time, the hydraulic motor 1 performs a pumping action to bring the interior of the main line 3A to low pressure, so that the low-pressure selecting valve 26 is switched to the operative position c. Accordingly, the hydraulic fluid from the auxiliary hydraulic source 29 is replenished into the main line 3A through the auxiliary control valve 126, the auxiliary line 30C and the line 27A, so that the interior of the main line 3A is not brought to negative pressure. Thus, it is possible to prevent cavitation from occurring.

Moreover, after the pressure control valve 10 has been returned to the neutral position N, the low-pressure selecting valve 26 continues to be connected to the main line 3A on the low pressure side at the operative position c, for as long as the hydraulic motor 1 continues to be rotated inertially. Accordingly, the hydraulic fluid from the auxiliary hydraulic source 29 can be replenished into the main line 3A, making it possible to prevent cavitation from occurring.

Thus, according to the present embodiment, since the cavitation liable to occur at stoppage of the hydraulic motor 1 can be prevented from occurring, it is possible to effectively prevent the hydraulic instruments, such as the hydraulic motor 1 and the like, from being damaged due to the cavitation which reduces their service life. Further, since the cavitation does not occur even if the restriction valves 24A and 24B are so set that switching speed of the pressure control valve 25 is made slow, the degree of freedom of design of the entire counter balance valve 21 can be enhanced, making it possible to minimize shock at stoppage. Furthermore, since it is possible to prevent the hydraulic fluid from the auxiliary pump 29 from being consumed wastefully at steady rotation of the hydraulic motor 1, an attempt can be made to raise efficiency.

Ninth Embodiment

A ninth embodiment of the invention will be described with reference to FIG. 16. In the figure, constitutional elements identical with those of the eighth embodiment are designated by the same reference numerals, and the description of the identical constitutional elements will be omitted. The present embodiment is arranged such that a backflow preventing valve composed of a pair of check valves is used as a means for causing the auxiliary line to communicate with one of a pair of main lines on the low pressure side.

Figure 16:
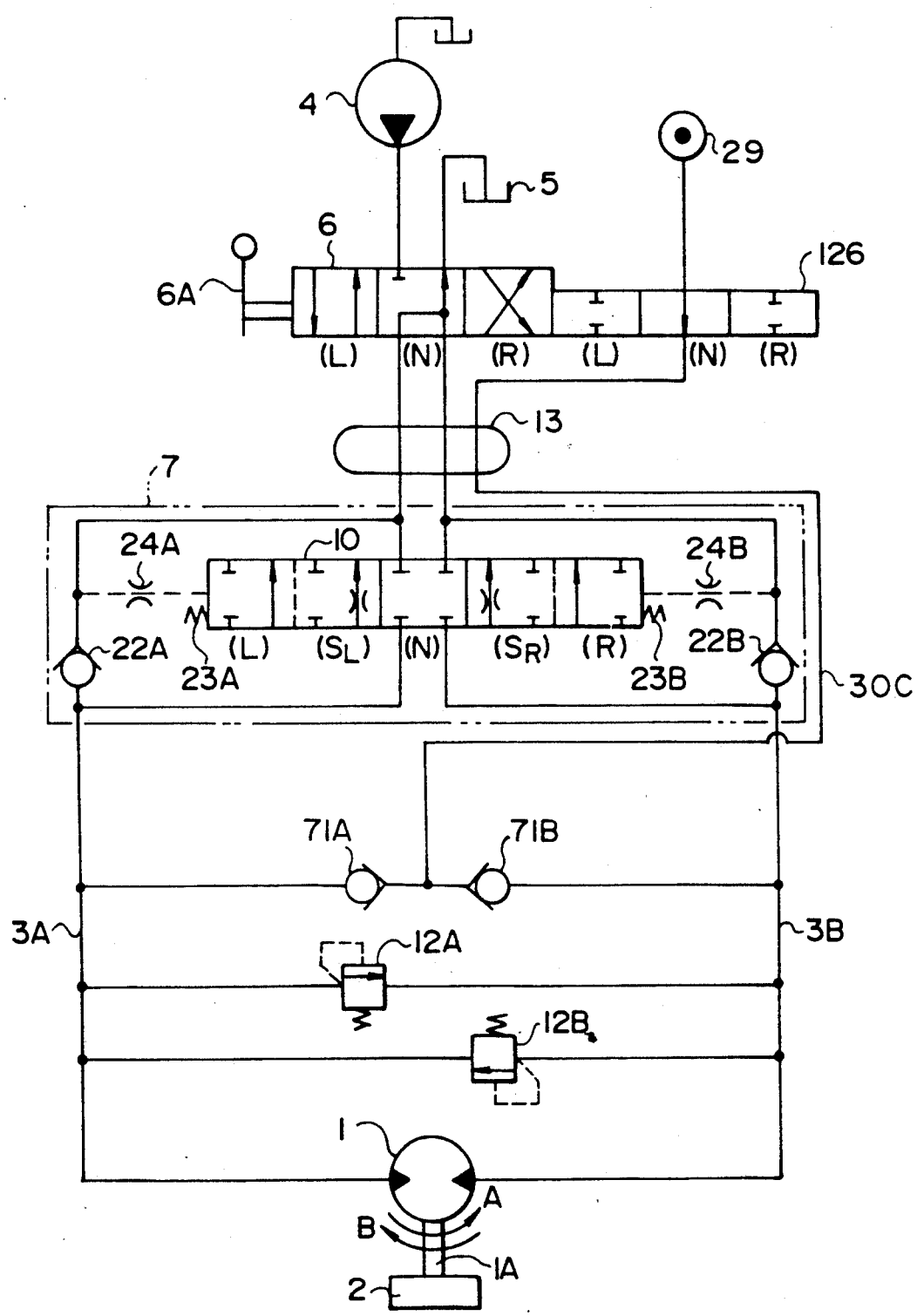
FIG. 16 is a schematic view of a hydraulic-motor drive circuit system according to a ninth embodiment of the invention.

In FIG. 16, the auxiliary line 30C is connected to a pair of check valves 71A and 71B, which cooperate with each other to form a backflow preventing valve. The check valves 71A and 71B are connected respectively to the main lines 3A and 3B at a location between the hydraulic motor 1 and the counter balance valve 7. The check valves 71A and 71B have respective predetermined opening pressures such that, when the pressure within the main line 3A or 3B is reduced to a value lower by the opening pressure as compared with the pressure within the auxiliary line 30C, the check valve 71A or 71B is opened to permit the hydraulic fluid from the auxiliary hydraulic source 29 to be replenished into the main line 3A or 3B, while the hydraulic fluid is prevented from flowing backward from the main line 3A or 3B toward the auxiliary line 30C.

Thus, the present embodiment constructed as described above can produce advantages substantially similar to those of the aforesaid eighth embodiment, and particularly, in the present embodiment, since the pair of check valves 71A and 71B are employed in substitution for the low-pressure selecting valve 26 of the eighth embodiment, it is possible to simplify the construction.

Tenth Embodiment

A tenth embodiment of the invention will be described with reference to FIG. 17. In the figure, constitutional elements identical with those of the ninth embodiment illustrated in FIG. 16 are designated by the same reference numerals, and the description of the identical constitutional elements will be omitted. The present embodiment is arranged such that the switched position of the directional control valve is electrically detected, and supply of the hydraulic fluid from the auxiliary hydraulic source is controlled to be switched on the basis of the detected signal.

Figure 17:
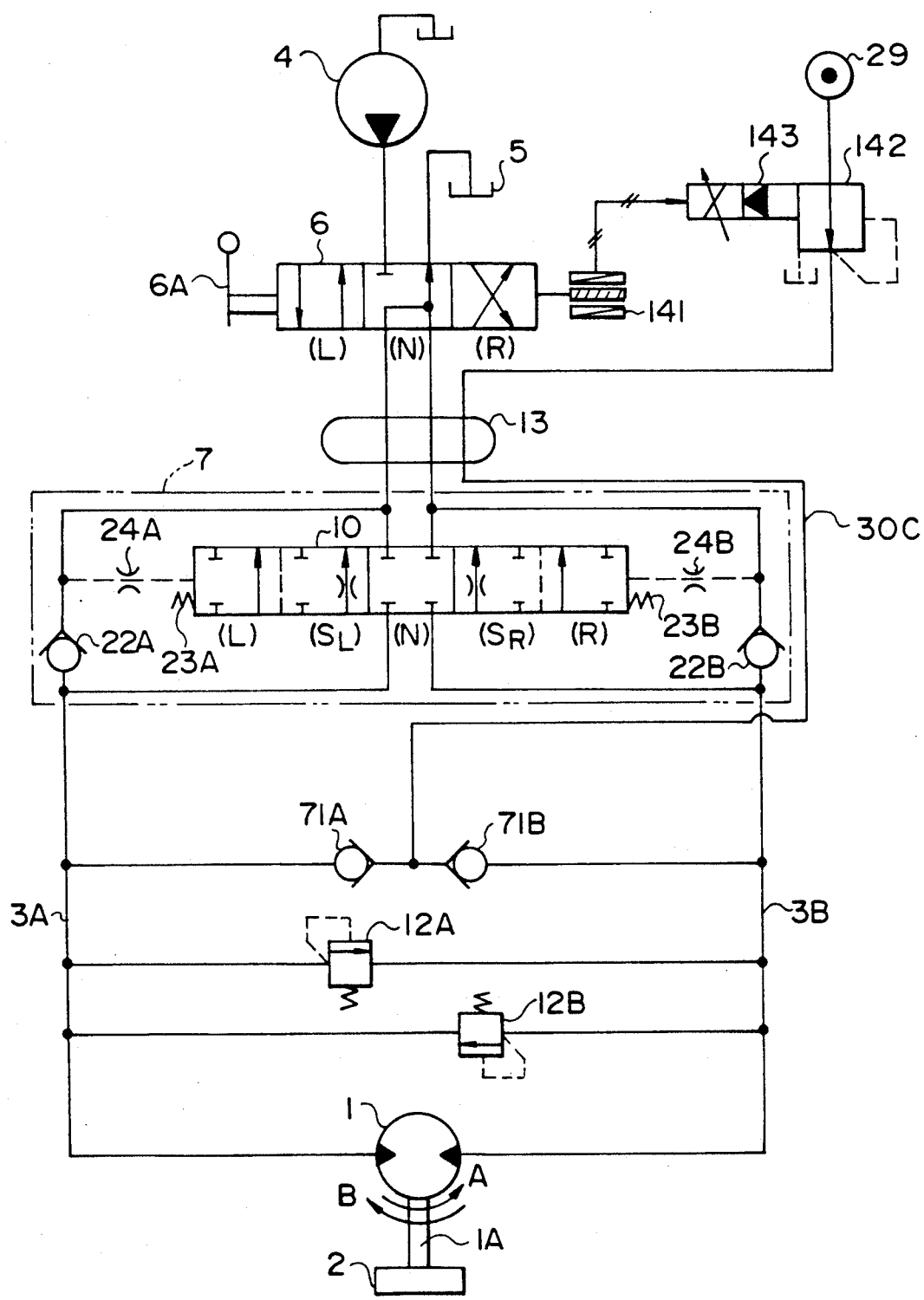
FIG. 17 is a schematic view of a hydraulic-motor drive circuit system according to a tenth embodiment of the invention.

In FIG. 17, the directional control valve 6 is provided with a position detector 141 for detecting a switched position of the directional control valve 6. A solenoid proportional pressure-reducing valve 142 is arranged between the auxiliary hydraulic source 29 in the auxiliary line 30C and the center joint 13. The solenoid proportional pressure-reducing valve 142 has a solenoid section 143 into which a signal from the position detector 141 is inputted. The solenoid proportional pressure-reducing valve 142 is constructed similarly to the solenoid proportional pressure-reducing valve 68 of the third embodiment illustrated in FIG. 6. Setting pressure of the solenoid proportional pressure-reducing valve 142 is regulated on the basis of the signal from the position detector 141, which is inputted to the solenoid section 143.

Here, the setting pressure of the pressure-reducing valve 142 varies from the pressure $P_a$ to the pressures $P_b$ and $P_c$ when the directional control valve 6 is switched from the neutral position N to the operative positions L and R. The pressures $P_b$ and $P_c$ are set to tank pressure ($P_b = P_c \approx 0$). The pressure $P_a$ is set to the level of $P_a = 10$ kg/cm$^2$ approximately.

Thus, in the present embodiment, since the setting pressure of the solenoid proportional pressure-reducing valve 142 is changed to one of the pressures $P_a$, $P_b$ and $P_c$ ($P_a > 0$, and $P_b = P_c \approx 0$), depending upon the position of the directional control valve 6, it is possible to produce advantages substantially similar to those of the ninth embodiment.

Eleventh Embodiment

An eleventh embodiment of the invention will be described with reference to FIG. 18. In the figure, constitutional elements identical with those of the ninth embodiment illustrated in FIG. 16 are designated by the same reference numerals, and the description of the identical constitutional elements will be omitted. The present embodiment is arranged such that a hydraulic motor of variable displacement type is used as the aforesaid hydraulic motor, and displacement of the hydraulic motor is controlled by the hydraulic fluid from the auxiliary line.

Figure 18:
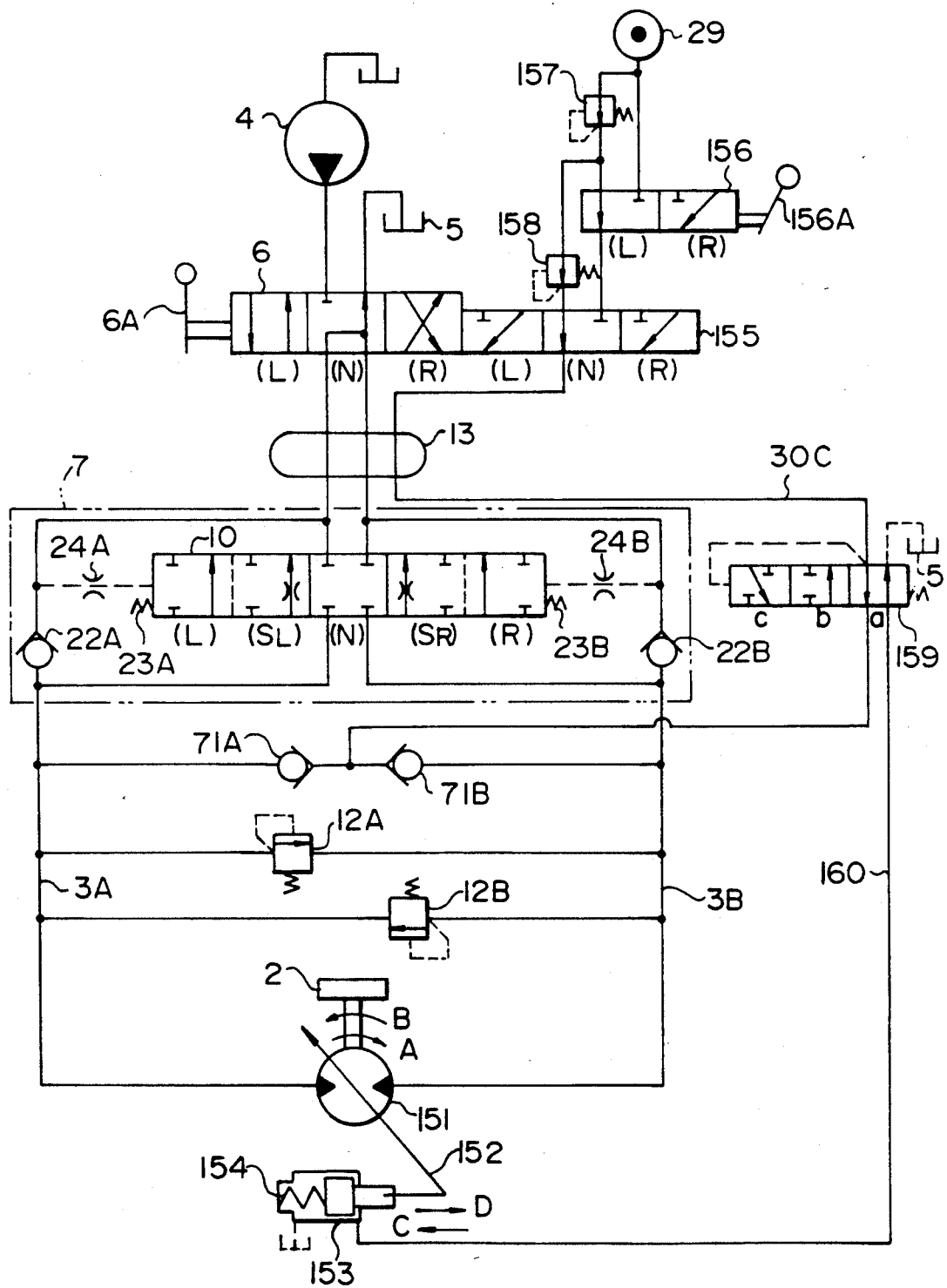
FIG. 18 is a schematic view of a hydraulic-motor drive circuit system according to an eleventh embodiment of the invention.

In FIG. 18, the reference numeral 151 denotes a hydraulic motor of variable displacement type which is connected to the hydraulic pump 4 and the reservoir 5 through the main lines 3A and 3B. The hydraulic motor 151 has a variable displacement element 152 driven to tilt in the direction indicated by the arrow D by a servo actuator 153, to switch the displacement of the hydraulic motor 151 between small displacement and large displacement. Here, the servo actuator 153 is set to the switching pressure $P_A$ under a biasing force of a spring 154. When pressure from a control line 160 to be described subsequently is raised to a value higher than the switching pressure $P_A$, the servo actuator 153 causes the variable displacement element 152 of the hydraulic motor 151 to tilt in the direction indicated by the arrow C, to switch the displacement of the hydraulic motor 151 to the large displacement from the small displacement. Further, when the pressure from the control line 160 is reduced to a value lower than the switching pressure $P_A$, the servo actuator 153 causes the variable displacement element 152 to tilt in the direction indicated by the arrow D, to switch the displacement of the hydraulic motor 151 to the small displacement.

An auxiliary control valve 155 is provided on the directional control valve 6 in integration therewith. The auxiliary control valve 155 is arranged in the auxiliary line 30C at a location between the auxiliary hydraulic source 29 and the center joint 13, and is switched to communication positions L and R from a communication position N in interlocking fashion with the directional control valve 6. Further, a displacement control valve 156 is arranged between the auxiliary hydraulic source 29 and the auxiliary control valve 155 in the auxiliary line 30C. The displacement control valve 156 is switched between a small displacement position R and a large displacement position L by manual operation of a control lever 156A when switching of displacement of the hydraulic motor 151 is desired.

Furthermore, the auxiliary line 30C is provided with a pair of pressure reducing valves 157 and 158, which are located among the auxiliary hydraulic source 29, the displacement control valve 156 and the auxiliary control valve 155. The pressure reducing valves 157 and 158 have respective setting pressures $P_1$ and $P_2$, which are set according to the relationship of $P_0 > P_1 > P_2$, as compared with delivery pressure $P_0$ of the auxiliary hydraulic source 29. The pressure within the auxiliary line 30C is reduced to the setting pressure $P_2$ due to the pressure reducing valve 158 when the auxiliary control valve 155 is in the communication position N. When the auxiliary control valve 155 is switched to the communication positions L and R, the pressure within the auxiliary line 30C is set to the setting pressure $P_1$ ($P_1 > P_2$) of the pressure reducing valve 157 by bringing the displacement control valve 156 to the small displacement position R, and the pressure within the auxiliary line 30C increases to the delivery pressure $P_0$ by switching the displacement control valve 156 to the large displacement position L.

Moreover, the auxiliary line 30C is provided with a control valve 159 at a location between the center joint 13 and the check valves 71A and 71B. The control valve 159 is composed of a control valve of hydraulic pilot type having four (4) ports and three (3) positions. When the pressure within the auxiliary line 30C is switched to one of the pressures $P_2$, $P_1$ and $P_0$, the control valve 159 is switched to one of operative positions a, b and c, correspondingly.

A control line 160 is connected between the control valve 159 and the servo actuator 153. When auxiliary control valve 155 is switched to the communication positions L and R together with the directional control valve 6, and the displacement control valve 156 is switched to the large displacement position L, the control valve 159 is switched to the operative position c. Accordingly, the control line 160 is switched to be connected to the auxiliary line 30C, whereby the hydraulic fluid of the delivery pressure $P_0$ ($P_0 > P_A$) is supplied to the servo actuator 153 to drive the same in the direction indicated by the arrow C. Further, when the control valve 159 is switched to the operative position a or b, the control line 160 connects the servo actuator 153 to the reservoir 5 to drive the servo actuator 153 in the direction indicated by the arrow D. Also, when the control valve 159 is in the operative position a, the pressure $P_2$ within the auxiliary line 30C is supplied toward the check valves 71A and 71B, and when the control valve 159 is in the operative position b or c, supply of the hydraulic fluid from the auxiliary line 30C is halted.

Thus, the present embodiment constructed as described above can produce advantages substantially similar to those of each of the aforementioned embodiments, and particularly, in the present embodiment, the hydraulic fluid within the auxiliary line 30C is introduced into the servo actuator 153 serving as another actuator, through the control valve 159 and the control line 160, whereby the displacement of the hydraulic motor 161 can be controlled to be switched from the small displacement to the large displacement. Thus, the auxiliary hydraulic source 29 is shared with the control line 160 and the auxiliary line 30C, whereby it is possible to prevent cavitation from occurring, without an increase in the number of lines of the center joint 13.

Further, during inertial rotation of the hydraulic motor 151, the auxiliary control valve 155 is brought to the communication position N, and the control valve 159 is returned to the operative position a. Accordingly, the hydraulic motor 151 is controlled automatically to be switched to the small displacement. Thus, the hydraulic motor 151 can be halted under the small displacement condition, making it possible to reduce the pumping action of the hydraulic motor 151 to relieve shock at stoppage.

Twelfth Embodiment

A twelfth embodiment of the invention will be described with reference to FIG. 19. In the figure, constitutional elements identical with those of the eleventh embodiment illustrated in FIG. 18 are designated by the same reference numerals, and the description of the identical constitutional elements will be omitted. The present embodiment is arranged such that the switched position of the directional control valve 6 is electrically detected, and supply of the hydraulic fluid from the auxiliary hydraulic source 29 is controlled to be switched on the basis of the detected signal.

Figure 19:
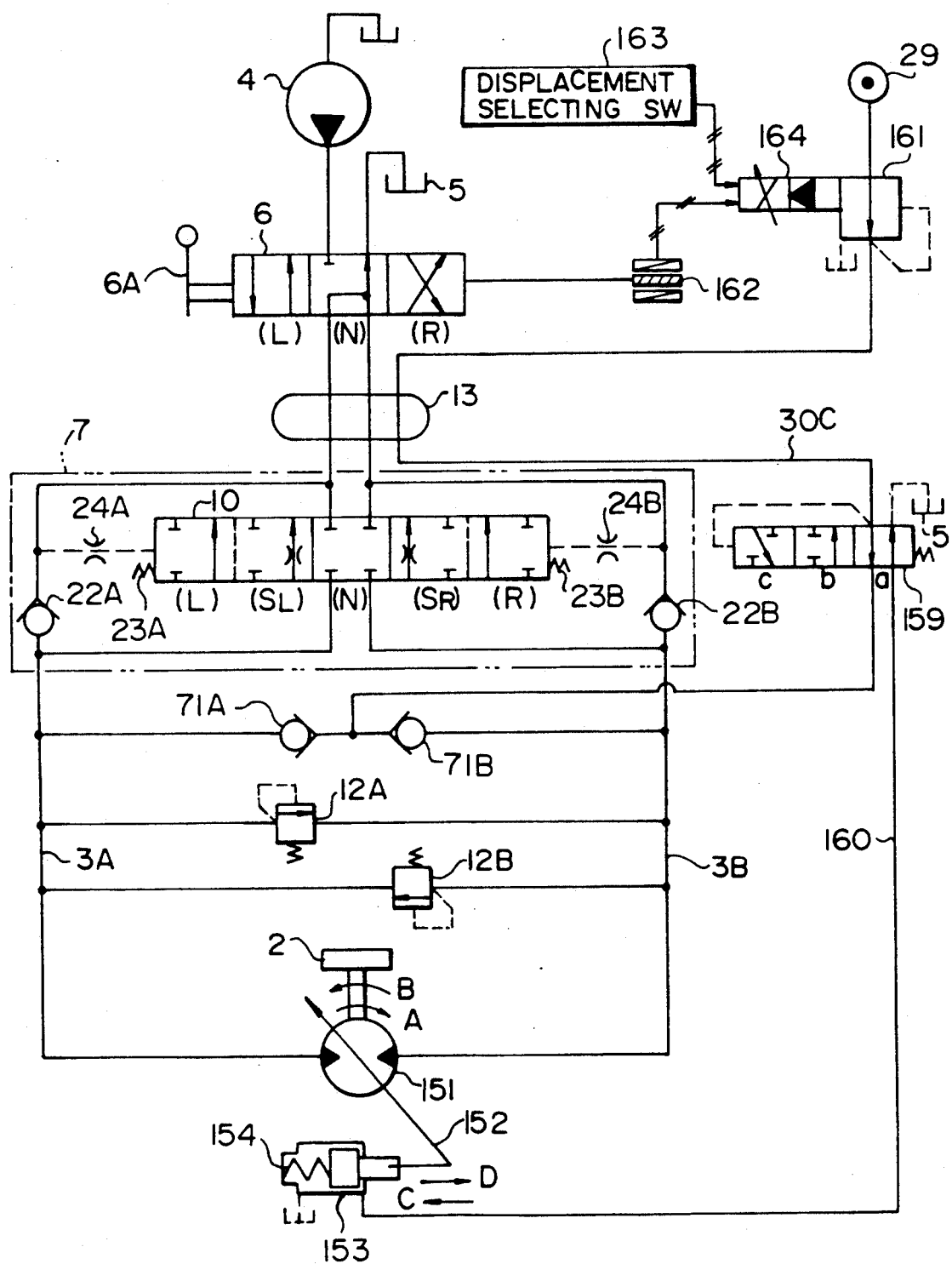
FIG. 19 is a schematic view of a hydraulic-motor drive circuit system according to a twelfth embodiment of the invention.

In FIG. 19, a solenoid proportional pressure-reducing valve 161 is arranged between the auxiliary hydraulic source 29 and the center joint 13 in the auxiliary line 30C. Setting pressure of the solenoid proportional pressure-reducing valve 161 varies by a position detector 162 provided on the directional control valve 6, and by a displacement selecting switch 163 installed within an operation room. Thus, pressure within the auxiliary line 30C is variable.

Here, the position detector 162 functions substantially similarly to the position detector 141 described with reference to the tenth embodiment, such that signals that are different from each other at the time the directional control valve 6 is in the neutral position N and the time the directional control valve 6 is switched to the operative position L or R are outputted to a solenoid section 164 of the solenoid proportional pressure-reducing valve 161, to vary the setting pressure of the pressure reducing valve 161 between the pressure $P_2$ and the pressures $P_1$ and $P_0$ ($P_0 > P_1 > P_2$). A signal from the displacement selecting switch 163 is outputted to the solenoid section 164, whereby the pressure reducing valve 161 is switched to any one of the setting pressures $P_1$ and $P_0$.

Thus, in the present embodiment constructed as described above, when the setting pressure of the pressure reducing valve 161 is switched to one of the pressures $P_2$, $P_1$ and $P_0$, the control valve 159 is successively switched to one of the operative positions a, b and c, correspondingly. Thus, the present embodiment can produce advantages substantially similar to the eleventh embodiment.

Thirteenth Embodiment

A thirteenth embodiment of the invention will be described with reference to FIG. 20. In the figure, constitutional elements identical with those of the ninth embodiment illustrated in FIG. 16 are designated by the same reference numerals, and the description of the identical constitutional elements will be omitted. The present embodiment is arranged such that the invention is applied to a circuit system which is not provided with the counter balance valve.

Figure 20:
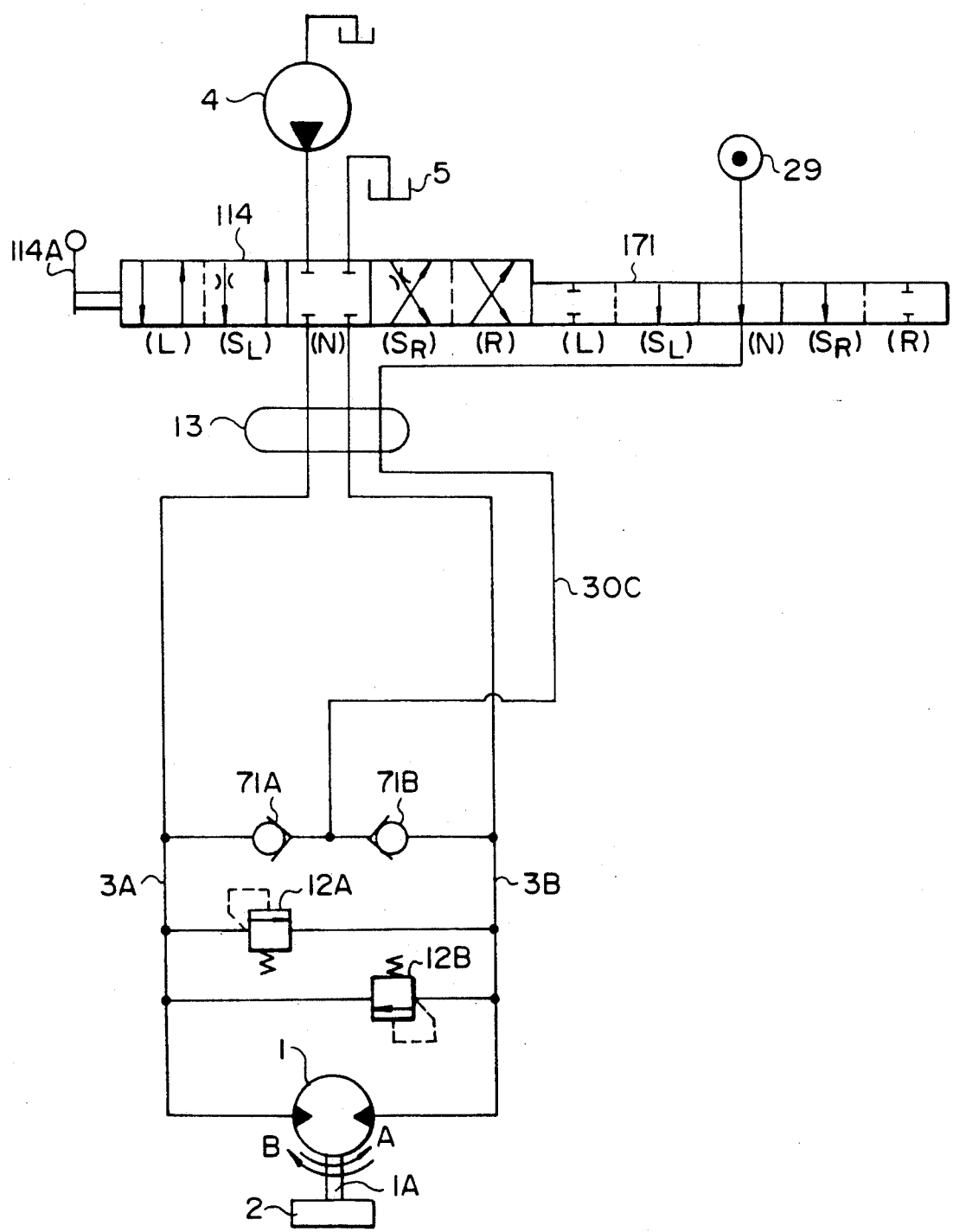
FIG. 20 is a schematic view of a hydraulic-motor drive circuit system according to a thirteenth embodiment of the invention.

In FIG. 20, the reference numeral 114 denotes a directional control valve of the closed center type. The directional control valve 114 is provided with a pair of intermediate restriction regions $S_L$ and $S_R$ between a neutral position N and left- and right-hand operative positions L and R. Shock at stoppage of the hydraulic motor 1 is relieved by the restriction regions $S_L$ and $S_R$. An auxiliary control valve 171 is integrated with the directional control valve 114, so that the pressure within the auxiliary line 30C is varied by the auxiliary control valve 171.

Here, the auxiliary control valve 171 is arranged to be switched to a pair of cutting-off positions L and R from a communication position N, in interlocking fashion with the directional control valve 114, and when the directional control valve 114 is in the restriction region $S_L$ or $S_R$, the auxiliary control valve 171 is in the communication regions $S_L$ or $S_R$, respectively. The auxiliary control valve 171 is brought to the cutting-off positions L and R at steady rotation of the hydraulic motor 1 to prevent the hydraulic fluid from the auxiliary hydraulic source 29 from being supplied toward the check valves 71A and 71B. At inertial rotation of the hydraulic motor 1, the auxiliary control valve 171 is brought to the communication regions $S_S$ or $S_R$, or the communication position N, to replenish the hydraulic fluid from the auxiliary hydraulic source 29 into the main line 3A or 3B on the low pressure side through the auxiliary line 30C and the check valve 71A or 71B.

Thus, the present embodiment constructed as described above can produce advantages substantially similar to those of the aforesaid eighth embodiment, and further, according to the present embodiment, there is provided a hydraulic-motor drive circuit system which is particularly suitable in use in a construction machine such as a small hydraulic excavator or the like.

Fourteenth Embodiment

A fourteenth embodiment of the invention will be described with reference to FIG. 21. In the figure, constitutional elements identical with those of the thirteenth embodiment illustrated in FIG. 20 are designated by the same reference numerals, and the description of the identical constitutional elements will be omitted. The present embodiment is arranged such that the invention is applied to a circuit system in which the hydraulic fluid from the auxiliary hydraulic source is used in release of a brake device of the hydraulic motor.

Figure 21:
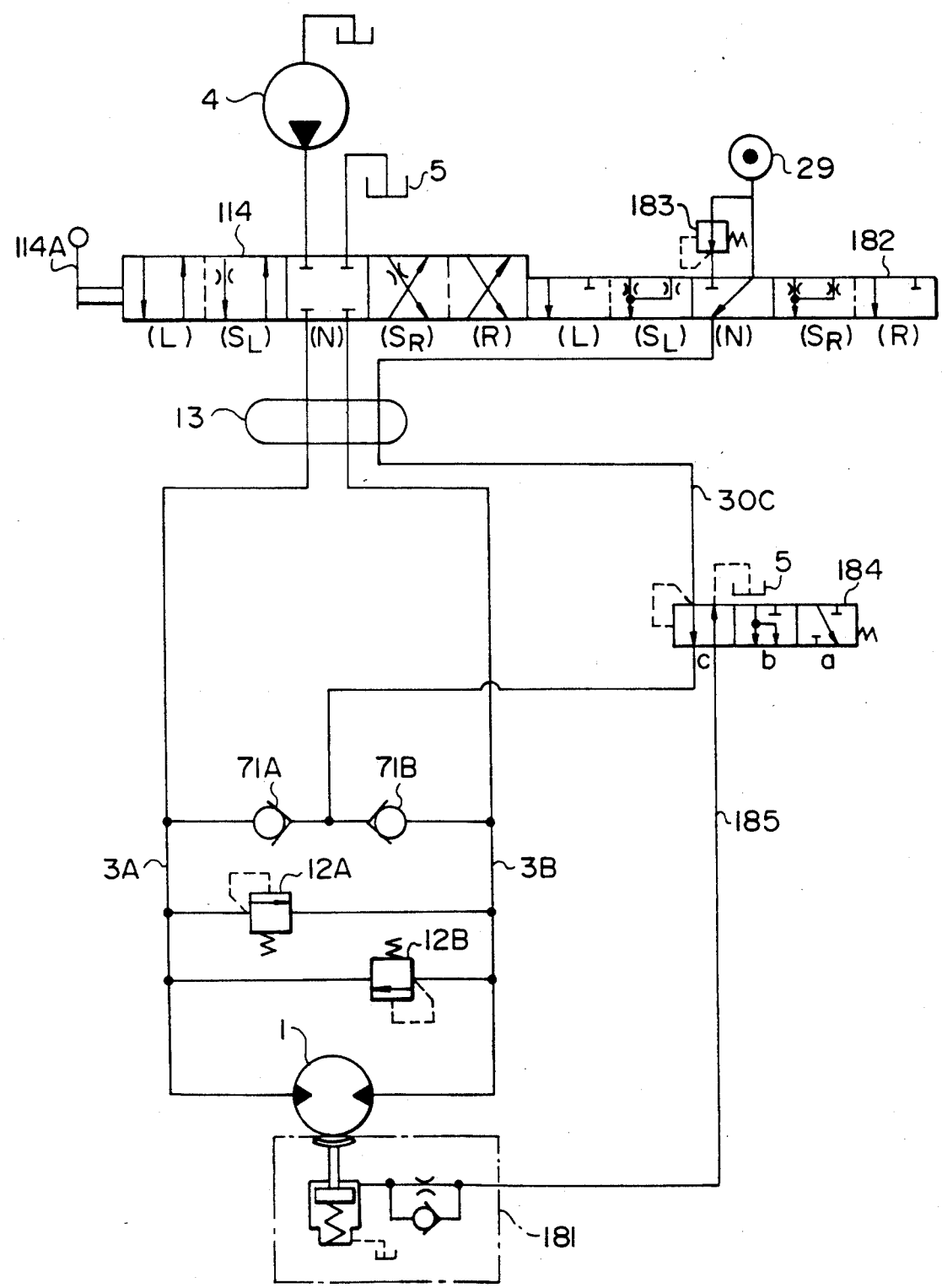
FIG. 21 is a schematic view of a hydraulic-motor drive circuit system according to a fourteenth embodiment of the invention. t

In FIG. 21, a brake device 181 serving as a parking brake is attached to the hydraulic motor 1. An auxiliary control valve 182 is integrated with the directional control valve 114. The auxiliary control valve 182 is switched to communication positions N, L and R and intermediate restriction regions $S_L$ and $S_R$ in interlocking fashion with the directional control valve 114. At the communication position N, the pressure within the auxiliary line 30C is raised to the delivery pressure $P_0$ of the auxiliary hydraulic source 29. When the auxiliary control valve 182 is switched to the communication positions L and R, the pressure within the auxiliary line 30C is reduced to the setting pressure $P_1$ of a pressure reducing valve 183. Further, the auxiliary control valve 182 varies the pressure within the auxiliary line 30C to the pressure $P_a$ ($P_a < P_0$) at the restriction regions $S_L$ and $S_R$.

A control valve 184 is arranged between the center joint 13 and the check valves 71A and 71B in the auxiliary line 30C. The control valve 184 is composed of a control valve of hydraulic pilot type having four (4) ports and three (3) positions. When the pressure within the auxiliary line 30C is switched to one of the pressures $P_1$, $P_a$ and $P_0$, the control valve 184 is successively switched to one of operative positions a, b and c, correspondingly.

The control valve 184 and the brake device 181 are connected to each other through a control line 185. When the control valve 184 is switched to the operative positions a and b, the control line 185 is switched to be connected to the auxiliary line 30C to release braking of the brake device 181 by the pressures $P_1$ and $P_a$ from the auxiliary line 30C. Furthermore, when the control valve 184 is switched to the operative position c, the control line 185 is connected to the reservoir 5 to apply the brake force of the hydraulic motor 1 by the brake device 181. Moreover, the control valve 184 halts supply of the hydraulic fluid toward the check valves 71A and 71B at the operative position a, and supplies the pressure $P_a$ and $P_0$ within the auxiliary line 30C to the check valves 71A and 71B at the operative positions b and c.

Thus, the present embodiment constructed as described above can produce advantages substantially similar to those of the aforesaid thirteenth embodiment, and particularly, in the present embodiment, the release pressure can be given to the brake device 181 by the pressure within the auxiliary line 30C, making it possible to prevent cavitation from occurring without an increase in the number of lines through the center joint 13.

In connection with the above thirteenth and fourteenth embodiments, the check valves 71A and 71B are connected to the main lines 3A and 3B at the location between the hydraulic motor 1 and the center joint 13. In place of this arrangement, however, the check valves 71A and 71B may be connected to the main lines 3A and 3B at a location between the center joint 13 and the directional control valve 114. In this case, since the line from the check valves 71A and 71B to the hydraulic motor 1 is lengthened, the delivery pressure of the auxiliary hydraulic source 29 should be raised. In the case of the thirteenth embodiment, the number of lines through the center joint 13 can be reduced, while, in the case of the fourteenth embodiment, the control valve 184 can be incorporated in the auxiliary control valve 182, and thus, an attempt can be made at compaction.

Furthermore, in the tenth through fourteenth embodiments, the backflow preventing valve composed of the check valves 71A and 71B is connected to the auxiliary line 30C. In place of this arrangement, the low-pressure selecting valve 26 described with reference to the eighth embodiment may be used.

INDUSTRIAL APPLICABILITY

According to the invention, since, when the directional control valve is returned to the neutral position from the operative position, the hydraulic fluid from the auxiliary hydraulic source is replenished into the main line on the low pressure side through the auxiliary line and the low-pressure selecting means, cavitation can effectively be prevented from occurring at inertial rotation of the hydraulic motor, making it possible to enhance the service life and to reduce shock at stoppage of the hydraulic motor. Moreover, since the hydraulic fluid from the auxiliary hydraulic source cannot wastefully be consumed at steady rotation of the hydraulic motor, energy efficiency can be raised, and reliability can be enhanced.

Further, the low-pressure selecting valve or the backflow preventing valve is incorporated in the counter balance valve, whereby the entirety can be made compact so that an attempt can be made to save space.

Furthermore, the displacement of the hydraulic motor is automatically controlled depending upon the drive force of the hydraulic motor, whereby prevention of cavitation and automatic switching of the displacement can be achieved by the use of the same auxiliary hydraulic source, making it possible to enhance the operability and the economical efficiency.

Additionally, according to the invention, there can be provided various advantages described in the paragraph of the best mode for carrying out the invention in the specification.

What is claimed is:

1. A hydraulic-motor drive circuit system comprising a hydraulic motor for rotatively driving an inertia load, a hydraulic pump serving as a main hydraulic source, a reservoir, a pair of main lines through which said hydraulic motor is connected to said hydraulic pump and said reservoir, and a directional control valve arranged in said pair of main lines for switching a direction of hydraulic fluid supplied to said hydraulic motor from said hydraulic pump, wherein the system comprises:

an auxiliary hydraulic source;
an auxiliary line having one end thereof connected to said auxiliary hydraulic source;
low-pressure selecting means connected to the other end of said auxiliary line and said pair of main lines for causing the other end of said auxiliary line to communicate with one of said pair of main lines on a low pressure side during rotation of said hydraulic motor;
switching control means arranged in said auxiliary line for supplying the hydraulic fluid from said auxiliary hydraulic source to the other end of said auxiliary line when said directional control valve is at least in a neutral position, and cutting off the supply of the hydraulic fluid from said auxiliary hydraulic source to the other end of said auxiliary line when said directional control valve is in an operative position; and
a counter balance valve arranged in said pair of main lines at a location between said directional control valve and said hydraulic motor, wherein said low-pressure selecting means is connected to said pair of main lines at a location between said counter balance valve and said hydraulic motor,
wherein said switching control means includes first valve means arranged in said auxiliary line for supplying, responsive to operation of said counter balance valve, the hydraulic fluid from said auxiliary hydraulic source to the other end of said auxiliary line when said counter balance valve is at least in a neutral position, and cutting off the supply of the hydraulic fluid from said auxiliary hydraulic source to the other end of said auxiliary line when said counter balance valve is in an operative position.

2. A hydraulic-motor drive circuit system according to claim 1, wherein said first valve means includes an auxiliary control valve integrated with said counter balance valve.

3. A hydraulic-motor drive circuit system according to claim 1, wherein said first valve means includes an auxiliary control valve incorporated in said counter balance valve.

4. A hydraulic-motor drive circuit system according to claim 1, further comprising a control line through which said auxiliary line is connected to another hydraulic actuator different from said hydraulic motor, and pressure control means for enabling hydraulic fluid of at least two different levels of pressures to be supplied to said control line on the basis of the hydraulic fluid from said auxiliary hydraulic source.

5. A hydraulic-motor drive circuit system according to claim 4, wherein said hydraulic motor comprises a hydraulic motor of variable displacement type having a displacement variable element, and wherein said another hydraulic actuator comprises an actuator which drives said displacement variable element to vary the displacement of said hydraulic motor.

6. A hydraulic-motor drive circuit system according to claim 4, wherein said another hydraulic actuator comprises a brake device for braking said hydraulic motor.

7. A hydraulic-motor drive circuit system according to claim 4, further comprising a counter balance valve arranged in said pair of main lines at a location between said directional control valve and said hydraulic motor, wherein said switching control means includes an auxiliary control valve responsive to operation of said counter balance valve, wherein said control line branches off from said auxiliary line at a location between said auxiliary hydraulic source and said auxiliary control valve, and wherein said pressure control means includes a solenoid proportional pressure-reducing valve arranged in said auxiliary line at a location between said auxiliary hydraulic source and the branching point of said control line.

8. A hydraulic-motor drive circuit system according to claim 7, wherein said pressure control means further includes means manually operated by an operator for outputting a signal to drive said solenoid proportional pressure-reducing valve.

9. A hydraulic-motor drive circuit system according to claim 7, wherein said pressure control means further comprises means for detecting a drive force of said hydraulic motor, means for detecting whether or not said directional control valve is in the neutral position, and computation means for deciding a pressure of the hydraulic fluid to be supplied to said control line, on the basis of signals from both of said detecting means, to output a corresponding signal to said solenoid proportional pressure-reducing valve.

10. A hydraulic-motor drive circuit system according to claim 7, wherein said pressure control means further includes means for detecting pressure in one of said pair of main lines on the high pressure side at a location between said directional control valve and said counter balance valve, and computation means for deciding a pressure of the hydraulic fluid to be supplied to said control line, on the basis of a signal from said detecting means, to output a corresponding signal to said solenoid proportional pressure-reducing valve.

11. A hydraulic-motor drive circuit system according to claim 1, wherein said low-pressure selecting means includes second valve means, incorporated in said counter balance valve, for selectively connecting the other end of said auxiliary line to one of the pair of main lines.

12. A hydraulic-motor drive circuit system according to claim 1, wherein said low-pressure selecting means includes a low-pressure selecting valve operative on the basis of a differential pressure between said pair of main lines.

13. A hydraulic-motor drive circuit system according to claim 1, wherein said low-pressure selecting means includes a backflow preventing valve having a pair of check valves permitting flow of the hydraulic fluid only toward said pair of main lines, respectively.

14. A hydraulic-motor drive circuit system comprising a hydraulic motor for rotatively driving an inertia load, a hydraulic pump serving as a main hydraulic source, a reservoir, a pair of main lines through which said hydraulic motor is connected to said hydraulic pump and said reservoir, and a directional control valve arranged in said pair of main lines for switching a direction of hydraulic fluid supplied to said hydraulic motor from said hydraulic pump, wherein the system comprises:

an auxiliary hydraulic source;
an auxiliary line having one end thereof connected to said auxiliary hydraulic source;
low-pressure selecting means connected to the other end of said auxiliary line and said pair of main lines for causing the other end of said auxiliary line to communicate with one of said pair of main lines on a low pressure side during rotation of said hydraulic motor;
switching control means arranged in said auxiliary line for supplying the hydraulic fluid from said auxiliary hydraulic source to the other end of said auxiliary line when said directional control valve is at least in a neutral position, and cutting off the supply of the hydraulic fluid from said auxiliary hydraulic source to the other end of said auxiliary line when said directional control valve is in an operative position, wherein:

said switching control means includes valve means responsive to operation of said directional control valve;

said valve means includes an auxiliary control valve provided in integration with said directional control valve; and said switching control means further includes means for detecting whether or not said directional control valve is in the neutral position, and wherein said valve means includes a solenoid proportional pressure-reducing valve arranged in said auxiliary line and operative on the basis of a signal from said detecting means.

15. A hydraulic-motor drive circuit system comprising a hydraulic motor for rotatively driving an inertia load, a hydraulic pump serving as a main hydraulic source, a reservoir, a pair of main lines through which said hydraulic motor is connected to said hydraulic pump and said reservoir, and a directional control valve arranged in said pair of main lines for switching a direction of hydraulic fluid supplied to said hydraulic motor from said hydraulic pump, wherein the system comprises:

an auxiliary hydraulic source;
an auxiliary line having one end thereof connected to said auxiliary hydraulic source;
low-pressure selecting means connected to the other end of said auxiliary line and said pair of main lines for causing the other end of said auxiliary line to communicate with one of said pair of main lines on a low pressure side during rotation of said hydraulic motor;
switching control means arranged in said auxiliary line for supplying the hydraulic fluid from said auxiliary hydraulic source to the other end of said auxiliary line when said directional control valve is at least in a neutral position, and cutting off the supply of the hydraulic fluid from said auxiliary hydraulic source to the other end of said auxiliary line when said directional control valve is in an operative position; and
a control line through which said auxiliary line is connected to another hydraulic actuator different from said hydraulic motor, and pressure control means for enabling hydraulic fluid of at least two different levels of pressures to be supplied to said control line on the basis of the hydraulic fluid from said auxiliary hydraulic source,
wherein said switching control means includes an auxiliary control valve responsive to operation of said directional control valve, and wherein said pressure control means includes pressure setting means arranged in said auxiliary line at a location between said auxiliary hydraulic source and said auxiliary control valve for setting pressures of a plurality of levels including said two different levels, and valve means connected to said auxiliary line and said control line at a location between said auxiliary control valve and said low-pressure selecting means, said valve means being responsive to the pressures of the plurality of levels set by said pressure setting means for causing said auxiliary line to selectively communicate with said control line.

16. A hydraulic-motor drive circuit system comprising a hydraulic motor for rotatively driving an inertia load, a hydraulic pump serving as a main hydraulic source, a reservoir, a pair of main lines through which said hydraulic motor is connected to said hydraulic pump and said reservoir, and a directional control valve arranged in said pair of main lines for switching a direction of hydraulic fluid supplied to said hydraulic motor from said hydraulic pump, wherein the system comprises:

an auxiliary hydraulic source;

an auxiliary line having one end thereof connected to said auxiliary hydraulic source;

low-pressure selecting means connected to the other end of said auxiliary line and said pair of main lines for causing the other end of said auxiliary line to communicate with one of said pair of main lines on a low pressure side during rotation of said hydraulic motor;

switching control means arranged in said auxiliary line for supplying the hydraulic fluid from said auxiliary hydraulic source to the other end of said auxiliary line when said directional control valve is at least in a neutral position, and cutting off the supply of the hydraulic fluid from said auxiliary hydraulic source to the other end of said auxiliary line when said directional control valve is in an operative position; and a control line through which said auxiliary line is connected to another hydraulic actuator different from said hydraulic motor, and pressure control means for enabling hydraulic fluid of at least two different levels of pressures to be supplied to said control line on the basis of the hydraulic fluid from said auxiliary hydraulic source, wherein said switching control means includes means for detecting whether or not said directional control valve is in the neutral position, and a solenoid proportional pressure-reducing valve arranged in said auxiliary line and operative at least on the basis of a signal from said detecting means for setting pressures of a plurality of levels including said two different levels, and wherein said pressure control means includes valve means connected to said auxiliary line and said control line at a location between said solenoid proportional pressure-reducing valve and said low-pressure selecting means and responsive to the pressures of the plurality of levels set by said solenoid proportional pressure-reducing valve for causing said auxiliary line to selectively communicate with said control line.

* * * * *